United States Patent
Shaji et al.

(10) Patent No.: US 9,659,384 B2
(45) Date of Patent: May 23, 2017

(54) SYSTEMS, METHODS, AND COMPUTER PROGRAM PRODUCTS FOR SEARCHING AND SORTING IMAGES BY AESTHETIC QUALITY

(71) Applicant: EyeEm Mobile GmbH, Berlin (DE)

(72) Inventors: Appu Shaji, Berlin (DE); Ramzi Rizk, Berlin (DE)

(73) Assignee: EyeEm Mobile GmbH., Berlin (DE)

(*) Notice: Subject to any disclaimer, the term of this patent is extended or adjusted under 35 U.S.C. 154(b) by 0 days.

(21) Appl. No.: 14/726,172

(22) Filed: May 29, 2015

(65) Prior Publication Data
US 2016/0098844 A1    Apr. 7, 2016

Related U.S. Application Data

(63) Continuation-in-part of application No. 14/506,103, filed on Oct. 3, 2014, now Pat. No. 9,412,043.

(51) Int. Cl.
*G06K 9/00* (2006.01)
*G06K 9/62* (2006.01)
(Continued)

(52) U.S. Cl.
CPC ........ *G06T 9/002* (2013.01); *G06F 17/30256* (2013.01); *G06K 9/6267* (2013.01); *G06T 9/00* (2013.01)

(58) Field of Classification Search
CPC .. G06K 9/623; G06K 9/6228; G06K 9/00624; G06K 9/4652; G06K 9/4671; G06K 2009/4666; G06K 2009/4657; G06K 9/6218; G06K 9/6255; G06K 9/68; G06K 9/80; G06T 5/40; G06T 7/0081; G06T 5/009; G06T 7/0097; G06T 2207/20081; G06T 2207/30168
USPC ....... 382/156, 112, 190, 192, 224, 176, 177, 382/299, 105, 173, 229, 100, 155; 348/222.1; 358/504
See application file for complete search history.

(56) References Cited

U.S. PATENT DOCUMENTS 6,816,847 B1 * 11/2004 Toyama ................... G06K 9/00 382/156
8,330,826 B2 * 12/2012 Cerosaletti ......... G06K 9/00664 348/222.1

(Continued)

OTHER PUBLICATIONS

Achanta et al. "Slic superpixels compared to state-of-the-art superpixel methods," IEEE Transactions on Pattern Analysis and Machines Intelligence, vol. 34(11):2274-2281, 2012.

(Continued)

*Primary Examiner* — Sheela C Chawan
(74) *Attorney, Agent, or Firm* — Rothwell, Figg, Ernst & Manbeck, P.C.

(57) ABSTRACT

A system, method, and computer program product for assigning an aesthetic score to an image. A method of the present invention includes receiving an image. The method further includes executing a neural network on the image to generate learned features. The method further includes applying a machine-learned model to assign an aesthetic score to the image, where a more aesthetically-pleasing image is given a higher aesthetic score and a less aesthetically-pleasing image is given a lower aesthetic score. The learned features are inputs to the machine-learned model.

27 Claims, 17 Drawing Sheets

(51) Int. Cl.
*G06T 9/00* (2006.01)
*G06F 17/30* (2006.01)

(56) References Cited

U.S. PATENT DOCUMENTS

| | | | |
|---|---|---|---|
| 8,594,385 B2 | 11/2013 | Marchesotti et al. | |
| 8,712,157 B2* | 4/2014 | Marchesotti | G06N 99/005 358/504 |
| 8,755,596 B2 | 6/2014 | Datta et al. | |
| 8,897,578 B2* | 11/2014 | Huang | G06K 9/4676 382/173 |
| 8,965,112 B1* | 2/2015 | Ibarz | G06K 9/6256 382/105 |
| 9,070,042 B2* | 6/2015 | Yamada | G06K 9/4642 |
| 9,106,838 B2* | 8/2015 | Fahn | G06K 9/4671 |
| 2006/0242139 A1 | 10/2006 | Butterfield et al. | |
| 2008/0077556 A1 | 3/2008 | Muriente | |
| 2014/0056518 A1* | 2/2014 | Yano | G06K 9/6267 382/173 |
| 2016/0055237 A1* | 2/2016 | Tuzel | G06F 17/30707 382/224 |

OTHER PUBLICATIONS

Burges "From RankNet to LambdaRank to LambdaMART: An overview," Microsoft Research TechnicalReport MSR-TR-2010-82, 2010, 19 pages.
Chatterjee, The Aesthetic Brain, Oxford University Press, 2014, 244 pages.
Dalal et al. "Histograms of oriented gradients for human detection," in Proceedings of Computer Vision and Pattern Recognition, 2005, 8 pages.
Hunter "Photoelectric color difference meter," Josa, vol. 48(12):985-993, 1958.
Koenderink "The structure of images," Biological Cybernetics, vol. 50:363-370, 1984.
Lowe "Object recognition from local scale-invariant features," in Computer Vision, 1999. The proceedings of the seventh IEEE International conference on, vol. 2, 8 pages.
Perronnin et al. "Large-scale image retrieval with compressed fisher vectors," in Computer Vision and Pattern Recognition (CVPR), 2010 IEEE Conference on IEEE, 8 pages.
Weston et al. "Wsable: Scaling up to large vocabulary image annotation," in IJCAI, vol. 11, 7 pages, 2011.
Bengio "Learning Deep Architectures for AI," Dept. IRO, Université de Montréal, http://www.iro.umontreal.ca/-bengioy, 56 pages.
Donahue, et al., "DeCAF: A Deep Convolutional Activation Feature for Generic Visual Recognition", arXiv:1310.1531v1 [cs.CV] 2013, 10 pages.
Chopra et al., "Learning a Similarity Metric Discriminatively, with Application to Face Verification", Courant Institute of Mathematical Sciences, New York University, 8 pages.
Karayev et al., "Recognizing Image Style", 2014, 20 pages.
Krizhevsky et al., "ImageNet Classification with Deep Convolutional Neural Networks", http://code.google.com/p/cuda-convnet/, 9 pages.
Simonyan et al., "Very Deep Convolutional Networks for Large-Scale Image Recognition", Visual Geometry Group, Department of Engineering Science, University of Oxford, arXiv: 1409.1556v6 [cs.CV], 2015, 14 pages.
Socher "Recursive Deep Learning for Natural Language Processing and Computer Vision", a Dissertation submitted to the Department of Computer Science and the Committee on Graduate Studies of Stanford University, 2014, 204 pages.
Szegedy "Going Deeper with Convolutions", arXiv:1409.4842v1 [cs.CV] 2014, 12 pages.

* cited by examiner

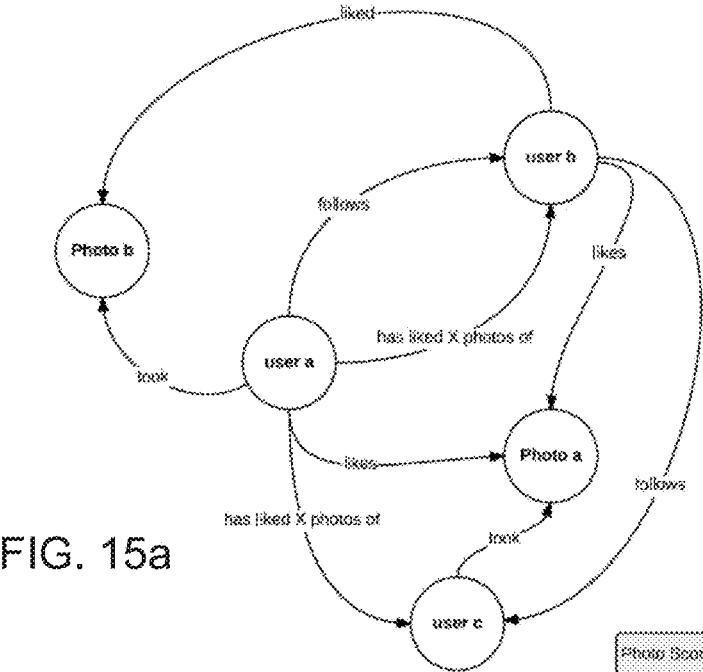
FIG. 15a
| | |
|---|---|
| Add / Remove nodes (new users or photos) | 1501 |
| Generate initial node score | 1502 |
| add/remove edges (likes, follows, other interactions) | 1503 |
| Recompute and rebalance graph scores | 1504 |
| Take snapshot of user and photo score | 1505 |
| Store updated scores | 1506 |
| Scores available through applications | 1507 |
FIG. 15b
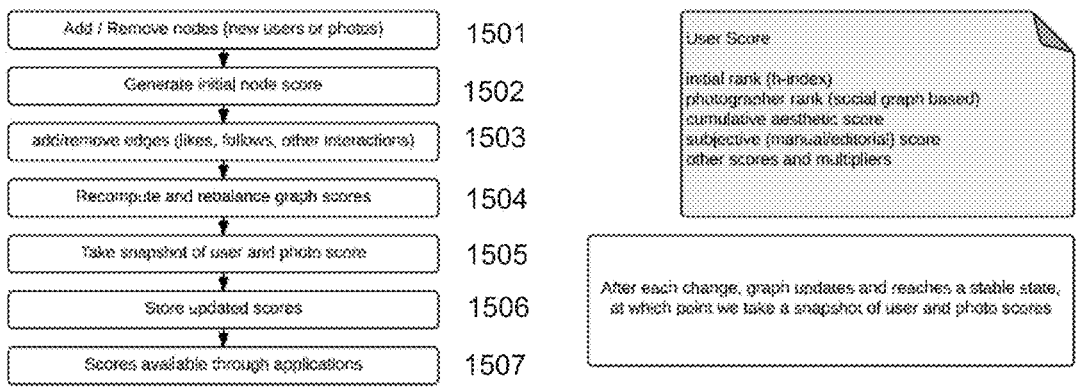
FIG. 15c

SYSTEMS, METHODS, AND COMPUTER PROGRAM PRODUCTS FOR SEARCHING AND SORTING IMAGES BY AESTHETIC QUALITY

CROSS REFERENCE TO RELATED APPLICATION(S)

This application is a continuation-in-part of, and claims priority to, U.S. application Ser. No. 14/506,103, entitled "SYSTEMS, METHODS, AND COMPUTER PROGRAM PRODUCTS FOR SEARCHING AND SORTING IMAGES BY AESTHETIC QUALITY", filed Oct. 3, 2014. The content of this application is incorporated herein by reference.

TECHNICAL FIELD

The present invention relates generally to systems, methods, and computer program products for enabling users to better manage, sort, search, display, and view images. More particularly, the present invention relates to assigning an aesthetic score to an image based on aesthetic quality.

BACKGROUND OF THE INVENTION

Existing systems for learning-to-rank algorithms are difficult to apply to images. Because text documents contain substantially less data than images and are much more structured (e.g. syntax, semantics, document-level structure) than image data, special care and attention must be taken to ensure that the dimensions of feature vectors used to train a machine-learned model are reasonable. Existing systems cannot simply be converted to apply to image features based on aesthetic quality.

What systems or methods that do exist for assigning an aesthetic score to an image suffer from several drawbacks, including poor performance and being limited to classification rather than ranking. These systems fail to assign an aesthetic score that correlates to intuitive notions of aesthetic quality. The use of such systems to order images by aesthetic quality or to search images by aesthetic quality is inadequate.

With over a trillion photographs being taken every year, many of which are in digital format as images on the Internet, it is a growing problem to be able to manage, sort, search, display, and view such images based on aesthetic quality. Thus there is a need for a system, method, and computer program product that assigns an aesthetic score to an image based on aesthetic quality, and that allows for sets of images to be ordered and searched based on aesthetic quality.

SUMMARY OF THE INVENTION

The present invention is directed to systems, methods, and computer program products for assigning an aesthetic score to an image. A plurality of images can be displayed in an order based on their aesthetic scores. A plurality of images can also be searched, such that the search results are ordered based on their aesthetic scores. The aesthetic score can be personalized according to, e.g., a user, a group of users, or an image genre.

Particular embodiments of the present invention are directed to systems, methods, and computer program products for assigning an aesthetic score to at least one image, for ranking and for searching a plurality of images.

In one particular embodiment, a method for assigning an aesthetic score to an image includes receiving an image. The method further includes executing a neural network on the image to generate learned features. The method further includes applying a machine-learned model to assign an aesthetic score to the image, wherein a more aesthetically-pleasing image is given a higher aesthetic score and a less aesthetically-pleasing image is given a lower aesthetic score. The learned features are inputs to the machine-learned model.

In some embodiments, the neural network is a deep neural network and the learned features are deep-learnt features. In some embodiments, the neural network includes a stack of filters followed by one or more fully connected layers, wherein the filters include at least one of convolution filters, rectified-linear unit filters, and max-pooling filters. In some embodiments the learned features includes outputs of one or more layers of the neural network. In some embodiments, the neural network includes a recursive-neural-network structure.

In some embodiments, the method further comprises extracting manually selected features from the image, wherein the manually selected features are indicative of aesthetic quality. In these embodiments, the method further comprises encoding the extracted manually selected features into a high-dimensional feature vector. In some embodiments, the neural network includes a fully connected layer which takes the encoded manually selected feature vector as an additional input. In other embodiments, the method further comprises reducing the dimension of the high-dimensional feature vector and concatenating the manually selected dimensionally-reduced feature vector and the learned features. In these embodiments, the concatenated features are inputs to the machine-learned model.

In some embodiments, extracting the manually selected features comprises determining a plurality of scales and for each of the plurality of scales, segmenting the image into a plurality of regions. The method further includes, for each of the plurality of scales and the plurality of regions computing a plurality of nearest and farthest regions according to a distance function, computing a local histogram of oriented gradients, and computing a color.

In some embodiments, the method further comprises pre-processing the image for input into the neural network, wherein the executing the neural network on the image comprises executing the neural network on the pre-processed image.

In some embodiments, the neural network is trained by a process comprising sampling a neural-net training set having a plurality of training images, wherein the sampling includes forming triplets $(Im_1^+, Im_2^+, Im_3^-)$ where $Im_1^+$ and $Im_2^+$ are members of the neural-net training set that are annotated as positive aesthetic images and $Im_3^-$ is a member of the neural-net training set that is annotated as a negative aesthetic image. The method further includes minimizing a loss function, whereby an embedding space is found where positive aesthetic images are close together and negative aesthetic images are spread apart. In some embodiments the loss function is a triple hinge loss function max $(0, c - \delta(\phi(Im_1^+), \phi(Im_2^+)) + \delta(\phi(Im_1^+), \phi(Im_3^-)))$, where c is a constant, $\delta$ is a distance function in the embedding space, and $\phi$ represents the learned features. In other embodiments, the loss function is a contrastive loss function.

In some embodiments the neural network is adapted to a genre or a user from a base neural network by the training process comprising providing an adapted training set, wherein the adapted training set includes images that the base neural network was not trained on. The training process further comprises initializing training parameters based on training parameters from the base neural network. In some embodiments, the adapted training set includes images that are annotated based on a user. In some embodiments, the annotation based on a user comprises annotating an image as aesthetically pleasing or not aesthetically pleasing based on whether the user has done at least one of: positively ranked or liked the image, viewed the image for an amount of time exceeding a predetermined threshold, visited the image for an amount of visits exceeding a predetermined threshold, purchased the image, positively ranked or liked a category associated with the image, positively ranked or liked a photographer associated with the image; and commented on the image. In some embodiments, the annotation based on a user further comprises annotating an image based on a similarity of the image to a previously annotated image. In some embodiments, the annotation based on a user comprises annotating an image as aesthetically pleasing or not aesthetically pleasing based on an analysis of a social network of the user. In some embodiments, the annotation based on a user comprises annotating an image as aesthetically pleasing or not aesthetically pleasing based on results from a recommendation engine, wherein the recommendation engine is based on user-metadata, image-metadata, and a social network of the user.

According to another aspect of the invention, a method for ranking images by aesthetic quality for display comprises receiving a plurality of images and assigning an aesthetic score to each of the plurality of images. The method further comprises displaying the plurality of images in an order based on the aesthetic score. In some embodiments, displaying the plurality of images comprises displaying a subset of the plurality of images. In some embodiments, the subset of the plurality of images is limited to a fixed number of images. In some embodiments, the subsets of the plurality of images is based on a minimum aesthetic score.

According to another aspect of the invention, a method for searching images by aesthetic quality comprises receiving a search query and a plurality of images based on the search query, whereby a list of search results is generated. The method further comprises displaying the list of search results by a method for ranking images by aesthetic quality for display. In some embodiments, searching a plurality of images comprises searching a plurality of metadata associated with the plurality of images.

According to another aspect of the invention, a device for assigning an aesthetic score to an image comprises a processor, a memory coupled to the processor, and a network interface coupled to the processor. In some embodiments, the processor is configured to receive an image. The processor is further configured to execute a neural network on the image to generate learned features. The processor is further configured to apply a machine-learned model to assign an aesthetic score to the image, wherein a more aesthetically-pleasing image is given a higher aesthetic score and a less aesthetically-pleasing image is given a lower aesthetic score. The learned features are inputs to the machine-learned model.

According to another aspect of the invention, a computer program product for assigning an aesthetic score to an image, said computer program product comprising a non-transitory computer readable medium storing computer readable program code embodied in the medium comprises program code for receiving an image. The computer program product further comprises program code for executing a neural network on the image to generate learned features. The computer program product further comprises program code for applying a machine-learned model to assign an aesthetic score to the image, wherein a more aesthetically-pleasing image is given a higher aesthetic score and a less aesthetically-pleasing image is given a lower aesthetic score. The learned features are inputs to the machine-learned model.

According to another aspect of the invention, a method for generating content associated with a topic is provided. The method includes providing a topic. The method also includes generating content associated with a topic can be used for curating content. The method also includes receiving a set of images associated with the topic is. The method also includes, for each image in the set of images, assigning a score to the image, wherein the score is based on user interactions with the image and an aesthetic score of the image. The method also includes filtering the set of images is filtered based on the assigned scores to create a subset of images.

In some embodiments, the received set of images includes search results for a pre-defined search parameter associated with the topic or images having metadata associated with the topic. In some embodiments, the metadata may include tags associated with the topic. In some embodiments, the aesthetic score is adapted to a user or a genre. In some embodiments, filtering the set of images based on the assigned scores to create a subset of images includes removing all but a top K number of the images, wherein K is a natural number. In some embodiments, filtering the set of images based on the assigned scores to create a subset of images includes removing all images where the assigned score less than a threshold value. In some embodiments, the threshold value is a pre-determine fixed value, while in other embodiments, the threshold value is adaptively determined based on the received images.

In some embodiments, the method further includes removing an image from the subset of images based on input from a user and replacing the removed image by an image with a next highest score from the set of images.

According to another aspect of the invention, a method for assessing the efficacy of changes to a social network including a plurality of users capable of uploading images to the social network is provided. The method includes determining a first metric for user and content quality for a first time period. The method also includes making a change to the social network, wherein the change occurs after the first time period. The method also includes, after making the change, determining a second metric for user and content quality for a second time period. The method also includes assessing the efficacy of the change based on the determined first and second metrics for user and content quality.

In some embodiments, the method also includes receiving a first set of images during the first time period and receiving a second set of images during the second time period. In these embodiments, the first metric includes determining a number of good images in the first set, wherein an image is determined to be good based on an aesthetic score associated with the image. Likewise, in these embodiments, the second metric includes determining a number of good images in the second set, wherein an image is determined to be good based on an aesthetic score associated with the image. In some embodiments, determining an image to be good based on the aesthetic score includes using a pre-determined or adaptively determined threshold. In some embodiments, the first metric further includes determining a histogram of aesthetic scores associated with the first set of images and wherein the second metric further includes determining a histogram of aesthetic scores associated with the second set of images.

In some embodiments, the method also includes receiving a first set of users during the first time period and receiving a second set of users during the second time period. In these embodiments, the first metric includes determining a number of good users in the first set, wherein a user is determined to be good based on a user score associated with the user. Likewise, in these embodiments, the second metric includes determining a number of good users in the second set, wherein a user is determined to be good based on a user score associated with the user. In some embodiments, determining a user to be good based on the user score includes using a pre-determined or adaptively determined threshold. In some embodiments, making a change to the social network includes changing a user signup process or changing how a user is exposed to content. In some embodiments, making a change to the social network includes changing a user experience design or user interface design. In some embodiments, assessing the efficacy of the change includes split A/B testing.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

FIG. 15a is a graphical representation of a graph in accordance with exemplary embodiments of the present invention.

FIG. 15b is a flow diagram illustrating steps of a method for periodically updating a graph in accordance with exemplary embodiments of the present invention.

FIG. 15c is a graphical representation of an image score and a photo score in accordance with exemplary embodiments of the present invention.

DETAILED DESCRIPTION

Referring to FIGS. 1-17, exemplary methods, systems, and computer program products for assigning an aesthetic score to an image and for ranking and searching images by aesthetic quality are provided.

Figure 1:
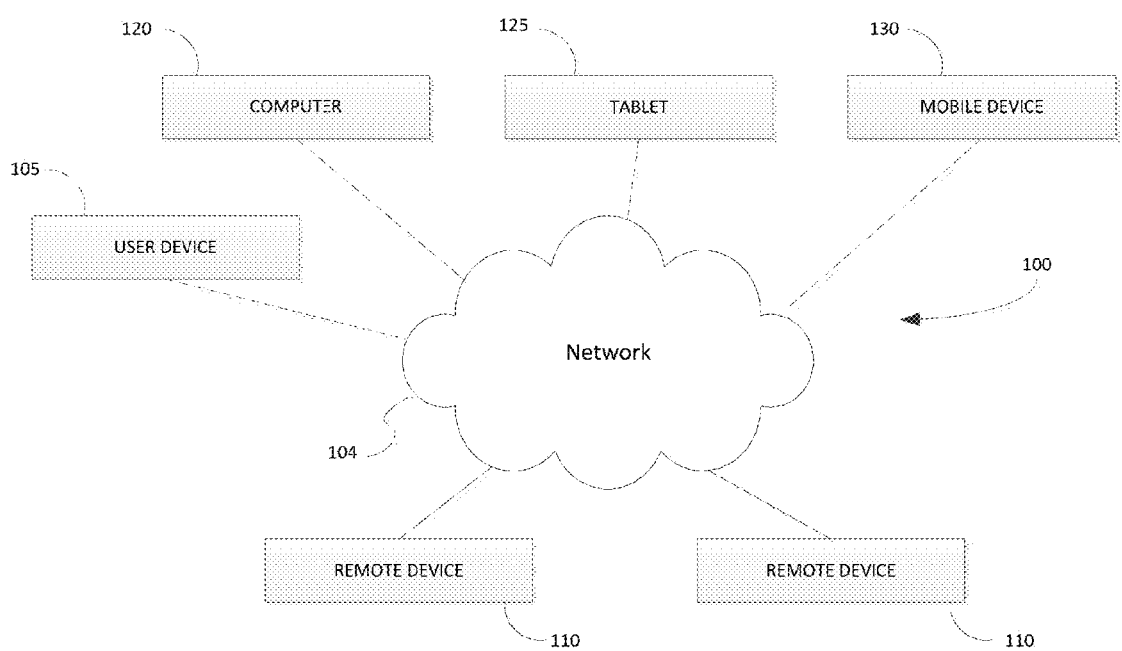
FIG. 1 illustrates an exemplary architecture of a communication system in accordance with exemplary embodiments of the present invention.

Referring now to FIG. 1, an exemplary architecture of a communication system in accordance with embodiments of the present invention is illustrated. System 100 includes at least one remote device 110 that is configured to communicate with one or more user devices 105 through a communications network 104 (e.g., the internet). Examples of user devices include a computer 120 (e.g., laptop or desktop), a tablet 125 (e.g., an iPad), and a mobile device 130 (e.g., a smartphone, such as, for an example, an iPhone). An example of a remote device 110 includes a server. The system, method and computer program product of the present invention can, for example, be deployed as a user/client-server implementation, as an ASP model, or as a standalone application running on a user device 105.

The user device 105 can be configured to communicate with one or more remote devices 110 via the network 104. Remote devices 110 are configured to generate, maintain, and host the computer program product in one embodiment. The remote devices 110 generate, maintain and host web pages (e.g., HTML documents) that embody the present invention. The remote devices 110 include services associated with rendering dynamic web pages, such as data storage services, security services, etc. Accordingly, remote devices 110 can include a conventional hardware arrangement and can be outfitted with software and/or firmware for performing web server functions for performing aspects of the present invention, such as, for example, javascript/jquery, HTML5, CSS2/3, and facilities for SSL, MySQL, PHP, SOAP, etc.

Remote devices 110 may be coupled with a data storage facility, which may include one or more local or remote memory systems or units, and can include one or more databases and/or file systems for storing data, media, graphics, HTML documents, XML documents, etc.

Remote devices 110 can be configured to include an admin function, which enables an administrator to perform system-related functions. The system-related functions can include maintaining user records, performing upgrades on the software and topic content, and the moderation of tasks.

Figure 2:
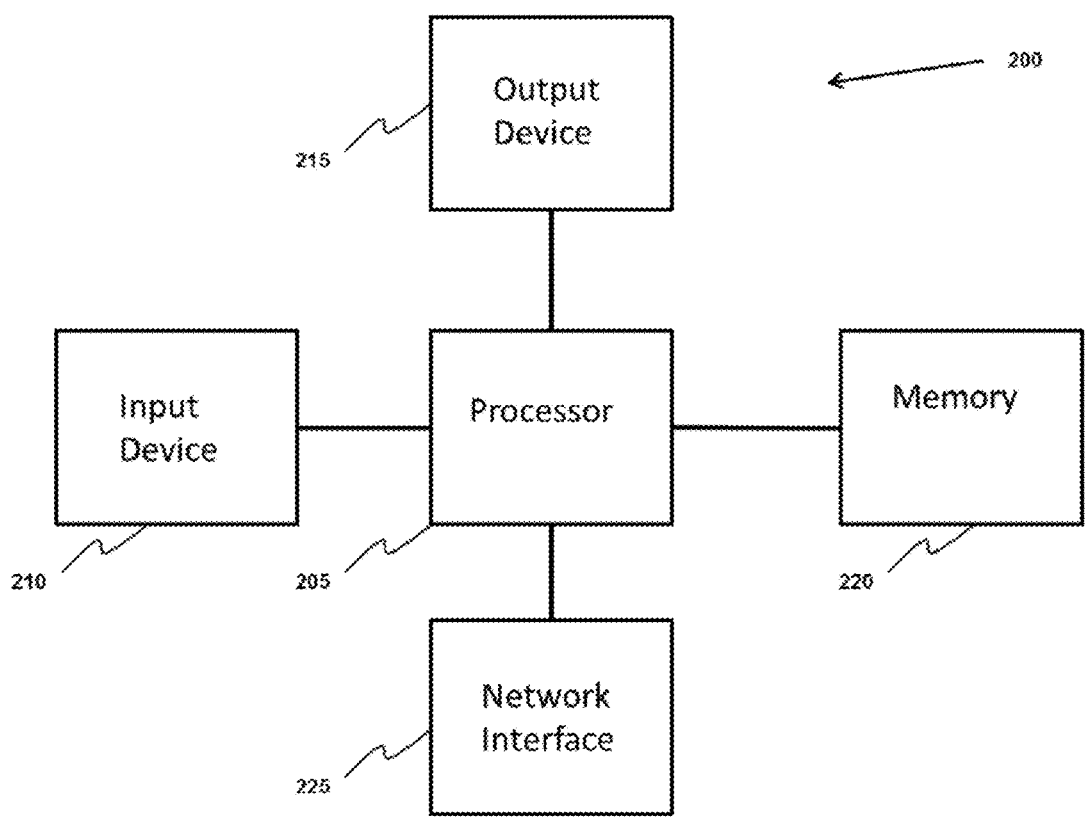
FIG. 2 is a block diagram of a user device in accordance with exemplary embodiments of the present invention.

Referring to FIG. 2, a block diagram of a device 200, such as for example, user device 105, computer 120, tablet 125, and mobile device 130, in accordance with exemplary embodiments of the present invention is illustrated. As shown in FIG. 2, the device 200 may include a processor 205, which may include one or more microprocessors and/or one or more circuits, such as an application specific integrated circuit (ASIC), field-programmable gate arrays (FPGAs), etc.

The device 200 may include a network interface 225. The network interface 225 is configured to enable communication with a communication network, using a wired and/or wireless connection.

The device 200 may include memory 220, such as non-transitive, which may include one or more non-volatile storage devices and/or one or more volatile storage devices (e.g., random access memory (RAM)). In instances where the device 200 includes a microprocessor, computer readable program code may be stored in a computer readable medium or memory, such as, but not limited to magnetic media (e.g., a hard disk), optical media (e.g., a OVO), memory devices (e.g., random access memory, flash memory), etc. The computer program or software code can be stored on a tangible, or non-transitive, machine-readable medium or memory. In some embodiments, computer readable program code is configured such that when executed by a processor, the code causes the device to perform the steps described below and herein. In other embodiments, the device is configured to perform steps described below without the need for code.

It will be recognized by one skilled in the art that these operations, algorithms, logic, method steps, routines, sub-routines, and modules may be implemented in software, in firmware, in special purpose digital logic, and any combination thereof without deviating from the spirit and scope of the present invention as recited within the claims attached hereto.

The device 200 may include an input device 210. The input device is configured to receive an input from either a user or a hardware or software component. Examples of an input device 210 include a keyboard, mouse, microphone, touch screen and software enabling interaction with a touch screen, etc. The device can also include an output device 215. Examples of output devices 215 include monitors, televisions, mobile device screens, tablet screens, speakers, remote screens, etc. The output device 215 can be configured to display images, media files, text, or video, or play audio to a user through speaker output.

Figure 3:
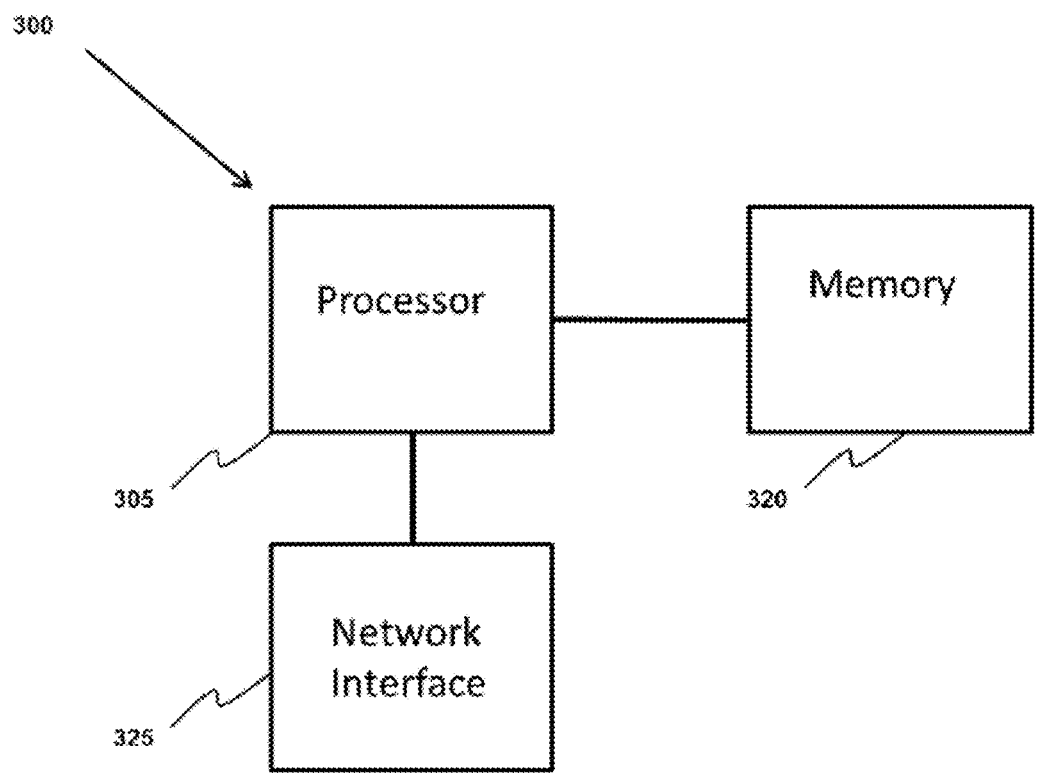
FIG. 3 is a block diagram of a remote device in accordance with exemplary embodiments of the present invention.

Referring now to FIG. 3, a block diagram of a remote device in accordance with exemplary embodiments of the present invention is illustrated. As shown in FIG. 3, the remote device 300 may include a network interface 315 for transmitting and receiving data, a processor 305 for controlling operation of the server device 300, and a memory 310 for storing computer readable instructions (e.g., software) and data. The network interface 315 and memory 310 are coupled to and communicate with the processor 305. Processor 305 controls the operation of network interface 315 and memory 310 and the flow of data and functionality between them. In various embodiments inputs can come from the device 200, to the remote device 300, via the network interface 315. Processing can occur at the remote device 300, at the device 200, or at both. In various embodiments, remote device 300 may be a server.

Processor 305 may include one or more microprocessors, and/or one or more circuits, such as an application specific integrated circuit (ASIC), field-programmable gate arrays (FPGAs), etc. Network interface 225 can be configured to enable communication with a communication network, using a wired and/or wireless connection. Memory 310 can include one or more non-volatile storage devices and/or one or more volatile storage devices (e.g., random access memory (RAM)). In instances where remote device 300 includes a microprocessor, computer readable program code may be stored in a computer readable medium, such as, but not limited to magnetic media (e.g., a hard disk), optical media (e.g., a DVD), memory devices (e.g., random access memory, flash memory), etc. In other embodiments, the device is configured to perform steps described below without the need for code. It will be recognized by one skilled in the art that these operations, logic, method steps, routines, algorithms, sub-routines, and modules may be implemented in software, in firmware, in special purpose digital logic, and any combination thereof without deviating from the spirit and scope of the present invention as recited within the claims attached hereto.

Figure 4:
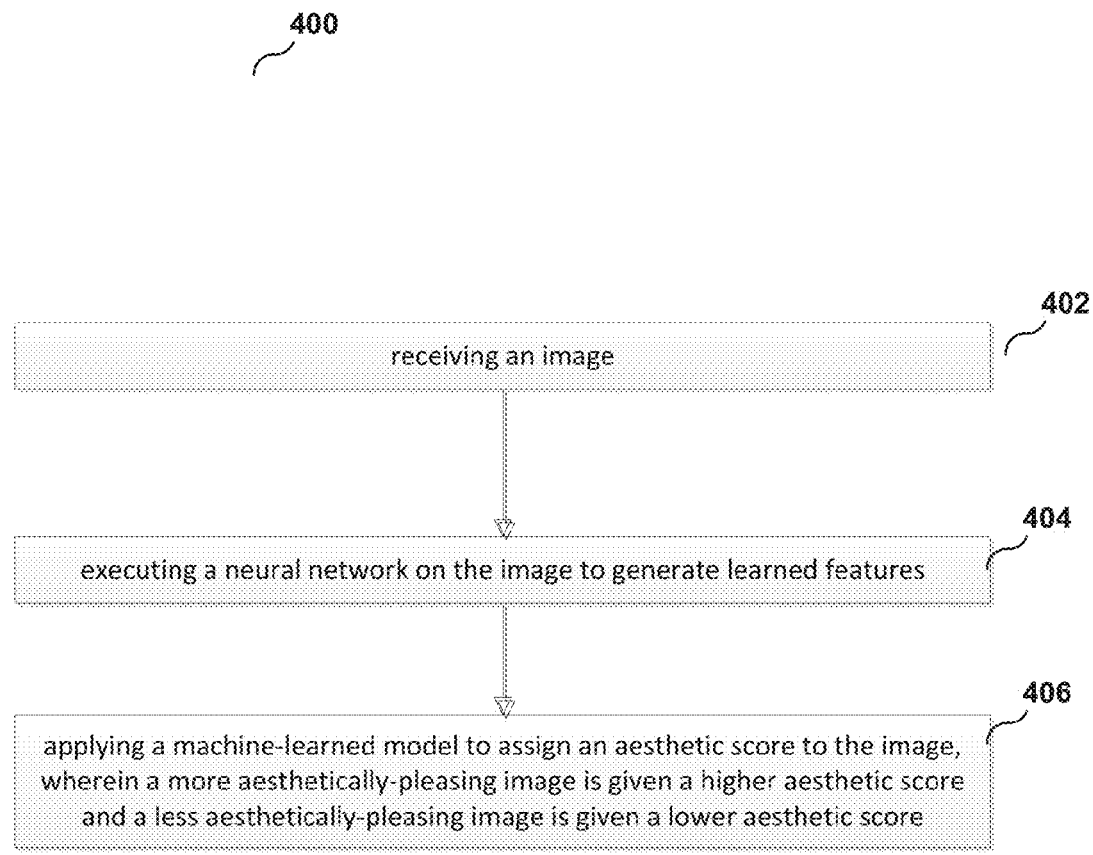
FIG. 4 is a flow diagram illustrating steps of a method for assigning an aesthetic score to an image.

FIG. 4 is a flow diagram illustrating steps of a method 400 for assigning an aesthetic score to an image. The method 400 includes receiving an image (step 402). In some embodiments, this may include batch processing of a set of stored images or it may include the online processing of images. In certain embodiments of the present invention, a user may select an image from a remote device or supply the image from a user device. In other embodiments the image may be identified by the remote device in response to a user request to rank or search a set of images.

Next, in method 400, a neural network is executed on the image to generate learned features (step 404). In certain embodiments of the present invention, the neural network is a deep neural network and the learned features are deep-learnt features. In some embodiments, the neural network includes a stack of filters followed by one or more fully connected layers, wherein the filters include at least one of convolution filters, rectified-linear unit filters, and max-pooling filters. In some embodiments, the neural network includes recursive deep learning, such as a Recursive Neural Network (RNN) or a Recursive Neural Tensor Network (RNTN). In some embodiments, before executing the neural network, the image is pre-processed. Non-limiting examples of such pre-processing may include re-sizing the image and adjusting the color of the image (for example, by subtracting a mean color from each pixel). In certain embodiments, the learned features include outputs of one or more layers of the neural network. For example, layers at different depths of the neural network may provide features representing different levels of information.

In some embodiments of the present invention, the neural network is trained by a process that comprises sampling a neural-net training set having a plurality of training images, wherein the sampling includes forming triplets ($Im_1^+$, $Im_2^+$, $Im_3^-$) where $Im_1^+$ and $Im_2^+$ are members of the neural-net training set that are annotated as positive aesthetic images and $Im_3^-$ is a member of the neural-net training set that is annotated as a negative aesthetic image. In certain embodiments, the neural-net training set may be the same as the training set used to train the machine-learned model. In other embodiments, the neural-net training set may be a different set, including, for example, a subset of the training set used for the machine-learned model. In some embodiments, training data in a training set (whether for training the neural network or training the machine-learned model) is in the form of pairwise relationships, e.g. image A is preferred aesthetically over image B (represented as (A, B)) or image B is preferred aesthetically over image A (represented as (B, A)). In certain embodiments the relationship may be neutral (i.e. no preference). With pairwise training data, forming triplets during sampling includes forming triplets ($Im_1^+$, $Im_2^+$, $Im_3^-$) for each set of pairs ($Im_1^+$, $Im_3^-$) and ($Im_2^+$, $Im_3^-$) in the pairwise data, where $Im_1^+$ is preferred aesthetically over $Im_3^-$ and $Im_2^+$ is preferred aesthetically over $Im_3^-$. It will be appreciated that the training data may be manually curated or extracted from other sources of data (e.g. images from a social network), and the annotations may be inferred from other known information about the images (e.g. page views, number of comments, source of image). The process for training the neural network, according to some embodiments, further involves minimizing a loss function, whereby an embedding space is found where positive aesthetic images are close together and negative aesthetic images are spread apart. In some embodiments, the loss function that is minimized during training of the neural network is a triple hinge loss function max $(0, c-\delta(\phi(Im_1^+), \phi(Im_2^+))+\delta(\phi(Im_1^+),\phi(Im_3^-)))$, where c is a constant, $\delta$ is a distance function in the embedding space, and $\phi$ represents the learned features. In other embodiments, the loss function is a contrastive loss function. In some embodiments, other loss functions that form an embedding space where positive aesthetic images are close together and negative aesthetic images are spread apart may be used.

Next, in method 400, a machine-learned model is applied to assign an aesthetic score to the image, wherein a more aesthetically-pleasing image is given a higher aesthetic score and a less aesthetically-pleasing image is given a lower aesthetic score (step 406). The learned features generated by executing the neural network are inputs to the machine-learned model. The machine-learned model may be learned using a number of different algorithms, including, for example, the LambdaMART, LamdaRANK, RankNet, and RankSVM algorithms. Other machine-learning algorithms that minimize pairwise or list-wise ranking loss may also be used. In an embodiment, the aesthetic scores are floating point values ranging from −1 to +1, where +1 indicates highly aesthetic images and −1 indicates non-aesthetic images.

In some embodiments, method 400 further comprises extracting manually selected features from the image, wherein the manually selected features are indicative of aesthetic quality. In these embodiments, the method 400 further comprises encoding the extracted manually selected features into a high-dimensional feature vector. In some embodiments, the encoded manually selected features are inputs into a fully connected layer of the neural network. In these embodiments, executing the neural network effectively reduces the dimension of the encoded manually selected features. In other embodiments, the high-dimensional feature vector is reduced and then concatenated with the learned features generated from executing the neural network. In this embodiment, the concatenated features are then fed as input into the machine-learned model. It will be appreciated that in certain embodiments, some manually selected features may be input directly into the neural network while other, possibly different, manually selected features may be dimensionally-reduced and concatenated with the learned features generated from the neural network to then be fed as input into the machine-learned model.

In some embodiments, extracting the manually selected features comprises determining a plurality of scales. For each of the plurality of scales, the image is segmented into a plurality of regions. For each of the plurality of regions and the plurality of scales, the following are computed: a plurality of nearest and farthest regions according to a distance function, a local histogram of oriented gradients, and a color. In certain embodiments of the present invention the segmenting is done using a superpixel algorithm, such as a simple linear iterative clustering (SLIC) superpixel algorithm. In certain embodiments, the distance function comprises a distance in CIE-LAB space. It will be appreciated that other suitable image features may be used, such as are known in the art or may in the future be discovered. In some embodiments, the manually selected features supplement the learned features to provide additional discriminative power.

In certain embodiments of the present invention, the reduction of the high-dimensional encoded features comprises applying a machine-learned projection matrix to keep the distance between pairs of aesthetic images and non-aesthetic images large and pairs of similar images (e.g. both aesthetic or both non-aesthetic) small. In certain embodiments the machine-learned projection matrix is learned using a WSABIE algorithm.

In some embodiments, the neural network is adapted to a genre or a user from a base neural network. Likewise, the additional data may relate to a group of genres or users. In these embodiments, the neural network is trained by a process comprising providing an adapted training set, wherein the adapted training set includes images that the base neural network was not trained on. The training process further comprises initializing training parameters based on training parameters from the base neural network. For example, if there is training data ($S_A$) in addition to what was used to train the neural network ($S_O$), such additional data may be used to fine-tune the model. When training the neural network, instead of randomly initializing the weights or parameters, or using some other standard initialization process, a previously trained neural network (trained on training set $S_O$) is used to provide the initial parameters. Where the additional training data is related to a particular genre or style, the newly trained neural network will be adapted to produce learned features more tailored to that particular genre or style. For example, the genre or style might be "street photography" or "wedding photography." Further examples of genres include "still life," "portraits," or "nature." One motivation to adapt a model to a specific genre or style is that images from that genre or style may have certain similar characteristics that are substantially unique to that genre or style, and adaptation will produce more discriminative features than a general, unadapted model would. Similarly, where the additional training data is related to a particular user, the newly trained neural network should generate learned features that are more discriminative in relation to that user.

In some embodiments, the adapted training set includes images that are annotated based on a user. For example, the additional data may comprise data that the user manually curated (such as by uploading to a social network) or that the user expressed approval or disapproval for. In some embodiments, the annotation based on a user comprises annotating an image as aesthetically pleasing or not aesthetically pleasing based on whether the user has done at least one of positively ranked or liked the image, viewed the image for an amount of time exceeding a predetermined threshold, visited the image for an amount of visits exceeding a predetermined threshold, purchased the image, positively ranked or liked a category associated with the image, positively ranked or liked a photographer associated with the image; and commented on the image. In some embodiments, the annotation further comprises annotating an image based on a similarity of the image to a previously annotated image. In some embodiments, the annotation based on a user comprises annotating an image as aesthetically pleasing or not aesthetically pleasing based on an analysis of a social network of the user. In some embodiments, the annotation based on a user comprises annotating an image as aesthetically pleasing or not aesthetically pleasing based on results from a recommendation engine, wherein the recommendation engine is based on user-metadata, image-metadata, and a social network of the user.

In some embodiments, a method for ranking images by aesthetic quality for display is provided. In these embodiments, a plurality of images is received. The method further comprises assigning an aesthetic score to each of the plurality of images, wherein the aesthetic score is generated by the method 400 for assigning an aesthetic score to an image. The method further comprises displaying the plurality of images in an order based on the aesthetic score. In some embodiments, the displaying the plurality of images comprises displaying a subset of the plurality of images. In some embodiments, the displaying the plurality of images is limited to a fixed number of images. In some embodiments, the subset of the plurality of images is based on a minimum aesthetic score.

In some embodiments, a method for searching images by aesthetic quality is provided. In these embodiments, the method comprises receiving a search query. The method further comprises searching a plurality of images based on the search query, whereby a list of search results is generated. The method further comprises displaying the list of search results by the method for ranking images by aesthetic quality for display. In some embodiments, the searching a plurality of images comprises searching a plurality of metadata associated with the plurality of images.

Figure 5:
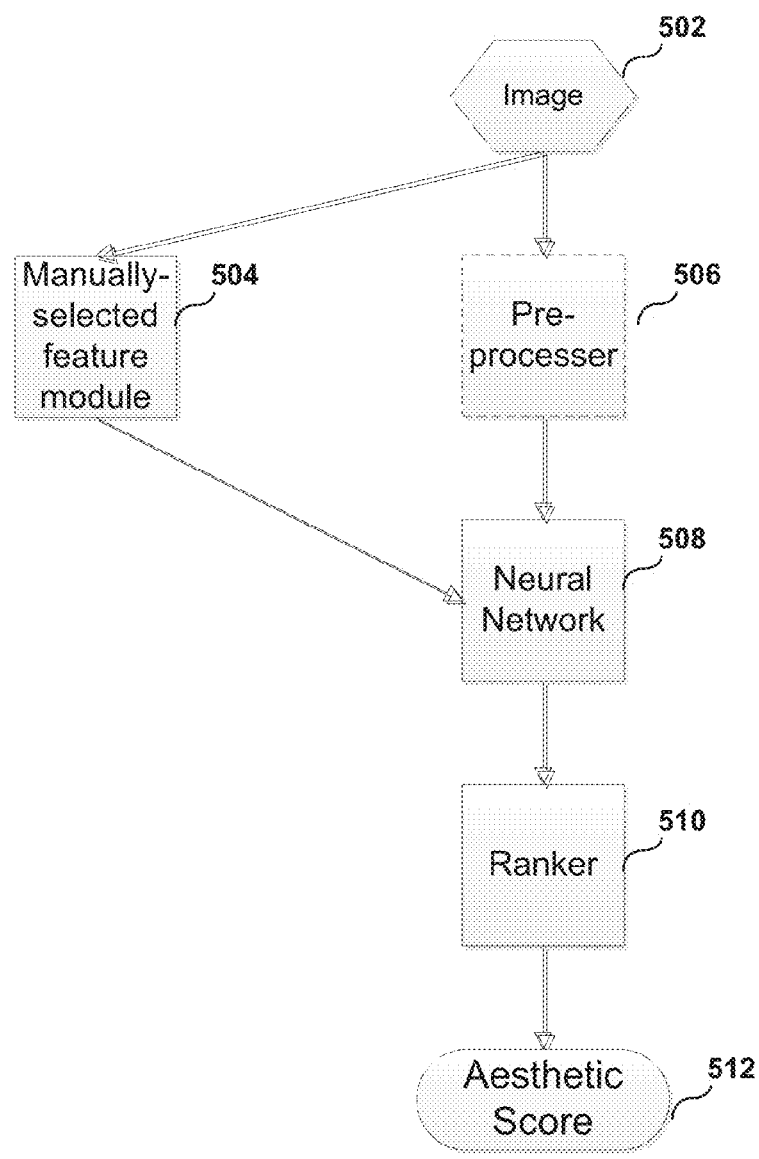
FIG. 5 is a block diagram illustrating an exemplary embodiment of the present invention.

FIG. 5 is a block diagram illustrating an exemplary embodiment of the present invention. In this embodiment, an image 502 is sent to a manually-selected feature module 504 and to a pre-processor 506. The manually-selected feature module 504 extracts and encodes manually selected features from the image 502. The pre-processor 506 optionally pre-processes the image 502, for example by re-sizing the image and by subtracting a mean color. In an embodiment, the pre-processor 506 does not change the image 502. The outputs from the manually-selected feature module 504 and the pre-processor 506 are fed into a neural network 508. The neural network 508 generates learned features, which are then fed into a ranker 510 to produce an aesthetic score 512 for the image 502.

Figure 6:
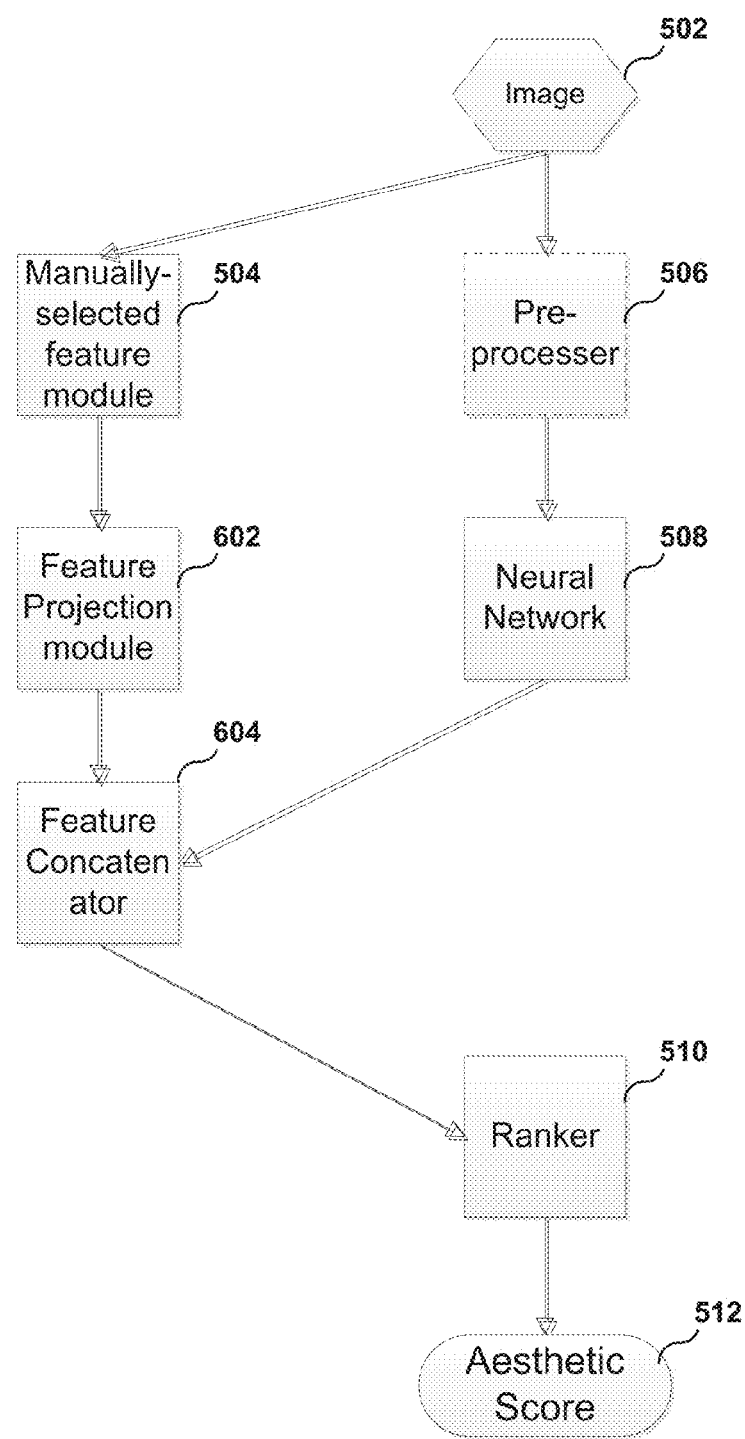
FIG. 6 is a block diagram illustrating an exemplary embodiment of the present invention.

FIG. 6 is a block diagram illustrating an exemplary embodiment of the present invention. In this embodiment, an image 502 is sent to a manually-selected feature module 504 and to a pre-processor 506. The manually-selected feature module 504 extracts and encodes manually selected features from the image 502. The encoded features from the manually-selected feature module 504 are fed into the feature projection module 602, which projects the features to an embedding space. The pre-processor 506 optionally pre-processes the image 502, for example by re-sizing the image and by subtracting a mean color. In an embodiment, the pre-processor 506 does not change the image 502. The output of the pre-processor 506 is fed into the neural network 508, which generates learned features. The outputs from the feature projection module 602 and the neural network 508 are then fed into the feature concatenator 604. The feature concatenator 604 feeds the concatenated features into a ranker 510 to produce an aesthetic score 512 for the image 502.

It will be appreciated that the block diagrams described in FIGS. 5 and 6 can be used separately or combined with different combinations of manually selected features.

Figure 7:
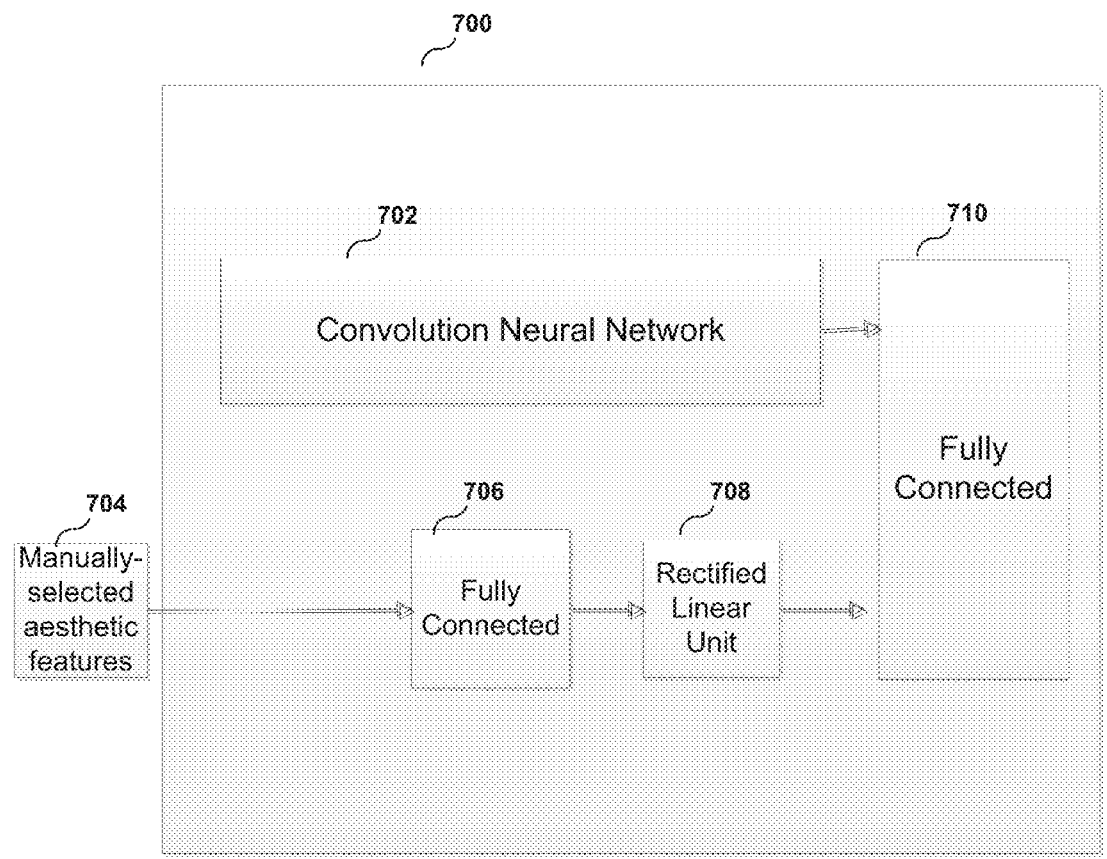
FIG. 7 is a diagram showing an exemplary architecture for a neural network in accordance with preferred embodiments.

FIG. 7 is a diagram showing an exemplary architecture for a neural network in accordance with preferred embodiments. In the embodiment shown, the neural network 700 includes a first network 702, comprising a stack of layers. In a preferred embodiment, the first network 702 is a convolution network. In another embodiment, the first network 702 is a Recursive Neural Network (RNN) or Recursive Neural Tensor Network (RNTN). The network 700 also includes a fully connected layer 706, taking as input manually selected aesthetic features 704, which are extracted from the image. The fully connected layer 706 feeds into a rectified-linear unit layer 708. The network also includes a fully connected layer 710, taking as input the output of the first network 702 and the rectified-linear unit layer 708. In a preferred embodiment, the network 700 is trained by minimizing a triple hinge loss function.

Figure 8:
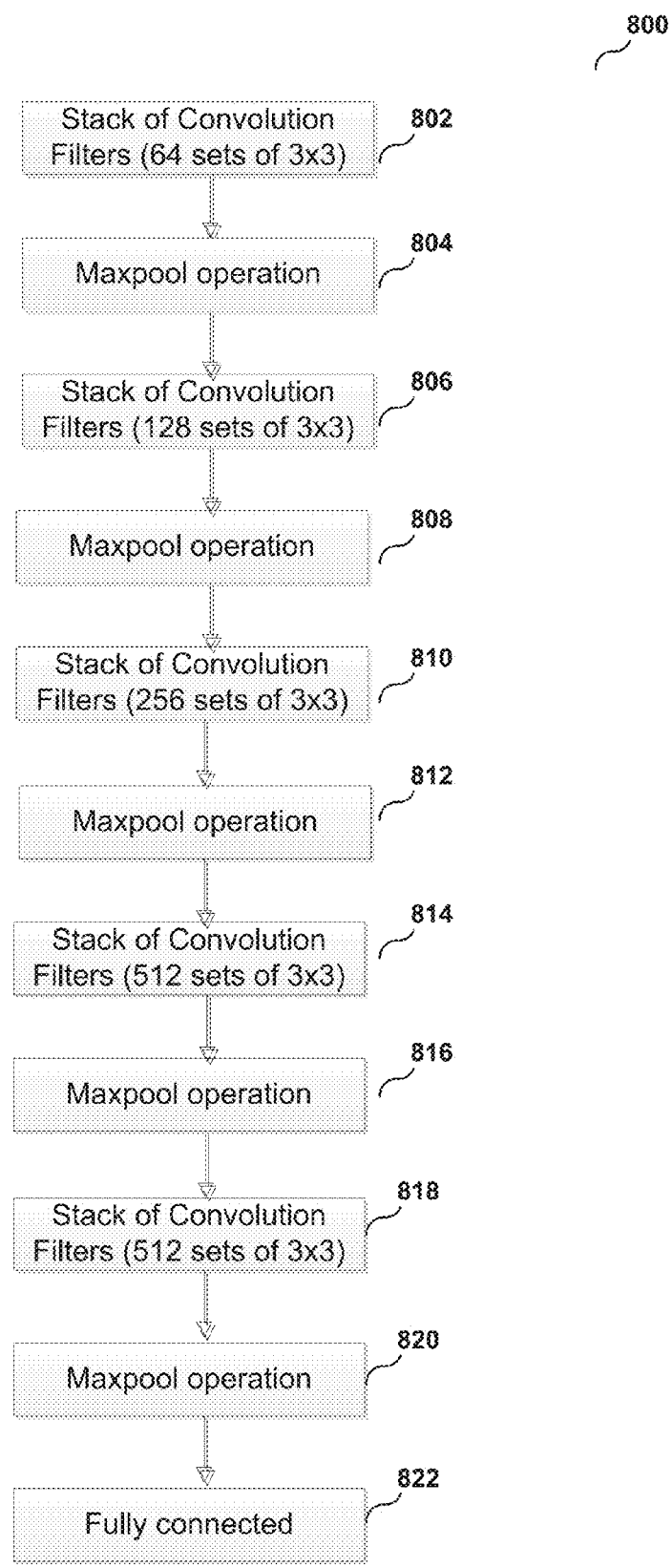
FIG. 8 is a diagram showing an exemplary architecture for a neural network in accordance with preferred embodiments.

FIG. 8 is a diagram showing an exemplary architecture for a neural network in accordance with preferred embodiments. In the embodiment shown, the exemplary architecture for the neural network may be based in part on, for example, the deep-learning architecture provided in Simonyan et al., Very Deep Convolutional Networks for Large-Scale Image Recognition. The network 800 includes a stack of convolution filters 802. For example, a layer of the neural network 800 will perform a number of convolution operations (64 in one embodiment) over local patches (of size 3×3 in one embodiment). Convolution filters of stack 802 each comprise 64 sets of a size 3×3. In one embodiment, the stack of convolution filters 802 includes two layers of convolution filters, with the first layer being the input of the second layer. The use of stacks of convolution filters without a maxpool operation between them can increase discriminative power and reduce the number of parameters to be trained, compared to using a single convolution layer with a larger receptive field. The maxpool operation is a form of non-linear downsampling. It will be appreciated that other types of pooling layers may be used. The stack of convolution filter 802 feeds into a maxpool operation 804, which in turn feeds into a stack of convolution filters 806. In one embodiment, the convolution filters of stack 806 each comprise 128 sets of size 3×3, and the stack 806 comprises two layers of convolution filters. Stack 806 feeds into maxpool operation 808, which in turn feeds into a stack of convolution filters 810. In one embodiment, the convolution filters of stack 810 are each 256 sets of size 3×3, and stack 810 comprises four layers of convolution filters. Stack 810 feeds into maxpool operation 812, which in turn feeds into a stack of convolution filters 814. In one embodiment, the convolution filters of stack 814 are each 512 sets of size 3×3, and stack 814 comprises four layers of convolution filters. Stack 814 feeds into maxpool operation 816, which in turn feeds into a stack of convolution filters 818. In one embodiment, the convolution filters of stack 818 are each 512 sets of size 3×3, and stack 818 comprises four layers of convolution filters. Stack 818 feeds into a maxpool operation 820, which feeds into a fully connected stack 822. The fully connected stack 822 may, in some embodiments, consists of three fully connected layers. In a preferred embodiment, manually selected aesthetic features are inputs to the last layer of the fully connected stack 822. It will be appreciated that the number of sets of convolutions, the sizes of the local patches, the order of filters and maxpool operations, and the number and placement of the fully connected layers can be different values in accordance with embodiments of the present invention.

Those skilled in the art will appreciate that the architecture for the neural network disclosed herein may also be based in part on other deep-learning architectures. For example, the architecture for the neural network disclosed herein may be based in part on the deep-learning architectures provided in Krizhevsky et al., "ImageNet Classifications with Deep Convolutional Neural Networks" or Szegedy et al., "Going Deeper with Convolutions," each of which describe possible deep-learning architectures that a person skilled in the art could modify, based on this disclosure, to apply to the problem of assessing aesthetic quality, and each of which is incorporated herein by reference.

Figure 9:
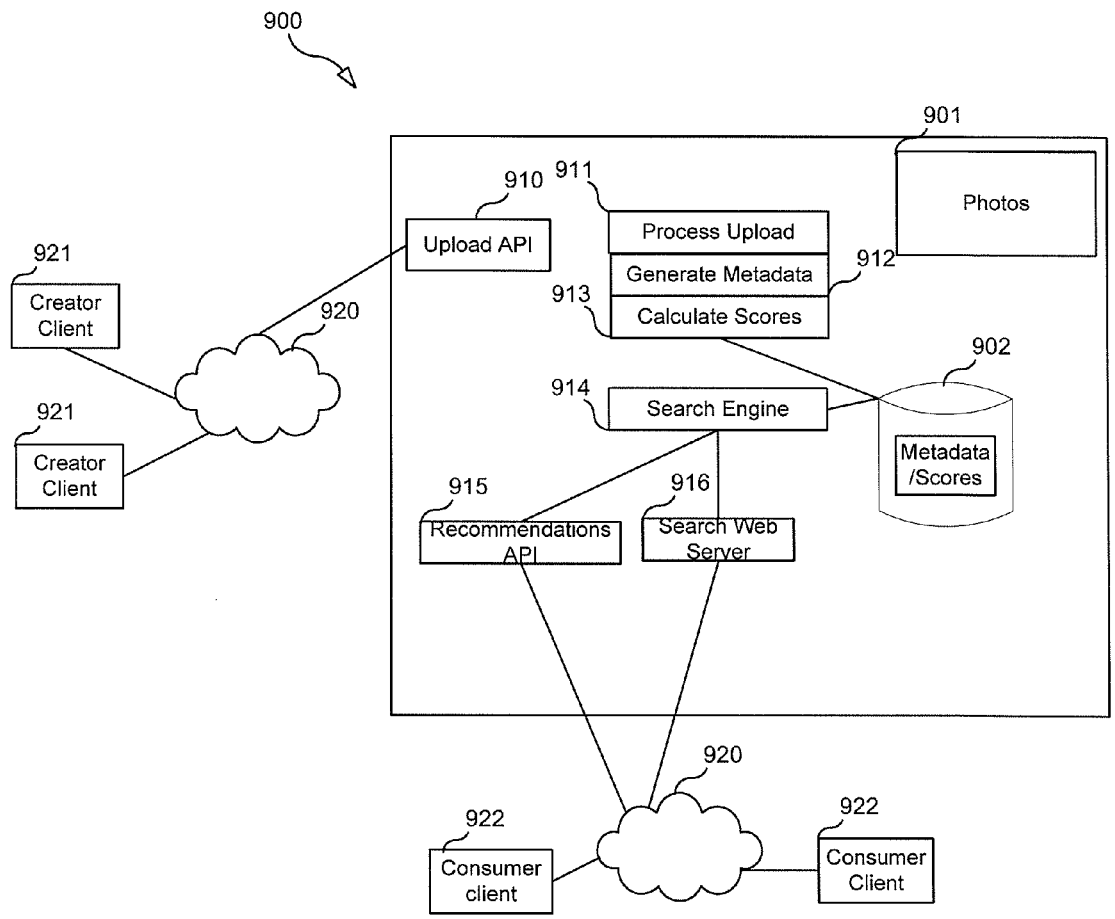
FIG. 9 is a block diagram of an image-processing system in accordance with exemplary embodiments of the present invention.

Referring now to FIG. 9, a block diagram of an image-processing system in accordance with exemplary embodiments of the present invention is illustrated. Users may communicate with the system 900 by a network 920. In certain embodiments, users may be distinguished as being image creators 921 or consumers 922. An image creator 921 may also be a consumer 922, and vice versa. The upload engine 910 allows users to upload images, which are stored. The generate metadata logic 912 automatically generates image-associated metadata (such as tags) by using computer vision methods, analyzing semantic ontologies derived from existing metadata, and analyzing the graph to determine co-occurrence or relevant tags. Scores are also calculated, including an aesthetic score based on the image's aesthetic quality. The search engine 916 processes a search query based on the stored images, the user-associated and image-associated metadata, and the graph. The recommendation engine 915 may display recommendations to a user, for instance, based upon a user's search query and user- and image-associated metadata.

Figure 10:
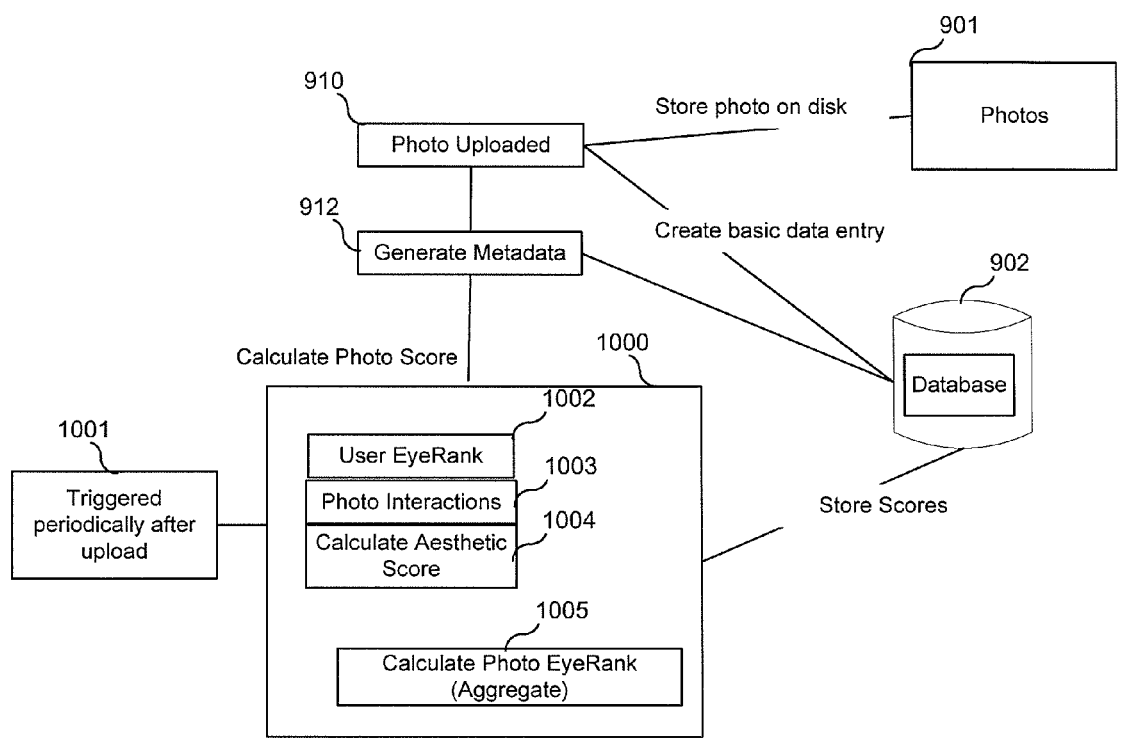
FIG. 10 is a block diagram of an image EyeRank logic in accordance with exemplary embodiments of the present invention.

Referring now to FIG. 10, a block diagram of an image EyeRank logic in accordance with exemplary embodiments of the present invention is illustrated. An image score 1005 (called image EyeRank) is generated when an image is uploaded. This is based on at least a user score 1002 (called user EyeRank), information about user interactions with the images 1003, and an aesthetic score 1004 of the image. This image EyeRank is periodically updated, based on changes to the graph such as new interactions and an updated user EyeRank.

Figure 11:
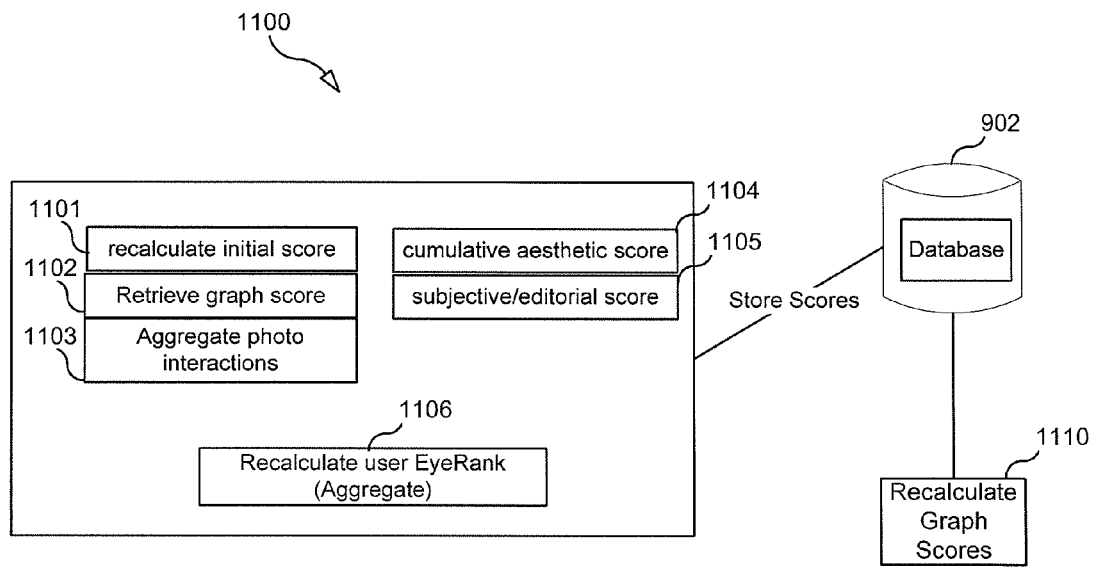
FIG. 11 is a block diagram of a user EyeRank logic in accordance with exemplary embodiments of the present invention.

Referring now to FIG. 11, a block diagram of a user EyeRank logic in accordance with exemplary embodiments of the present invention is illustrated. A user's EyeRank may be calculated based on an initial score, a graph score, an aggregation of the user's interactions with images, an aggregation of aesthetic scores for images belong to the user, and an editorial score.

Figure 12:
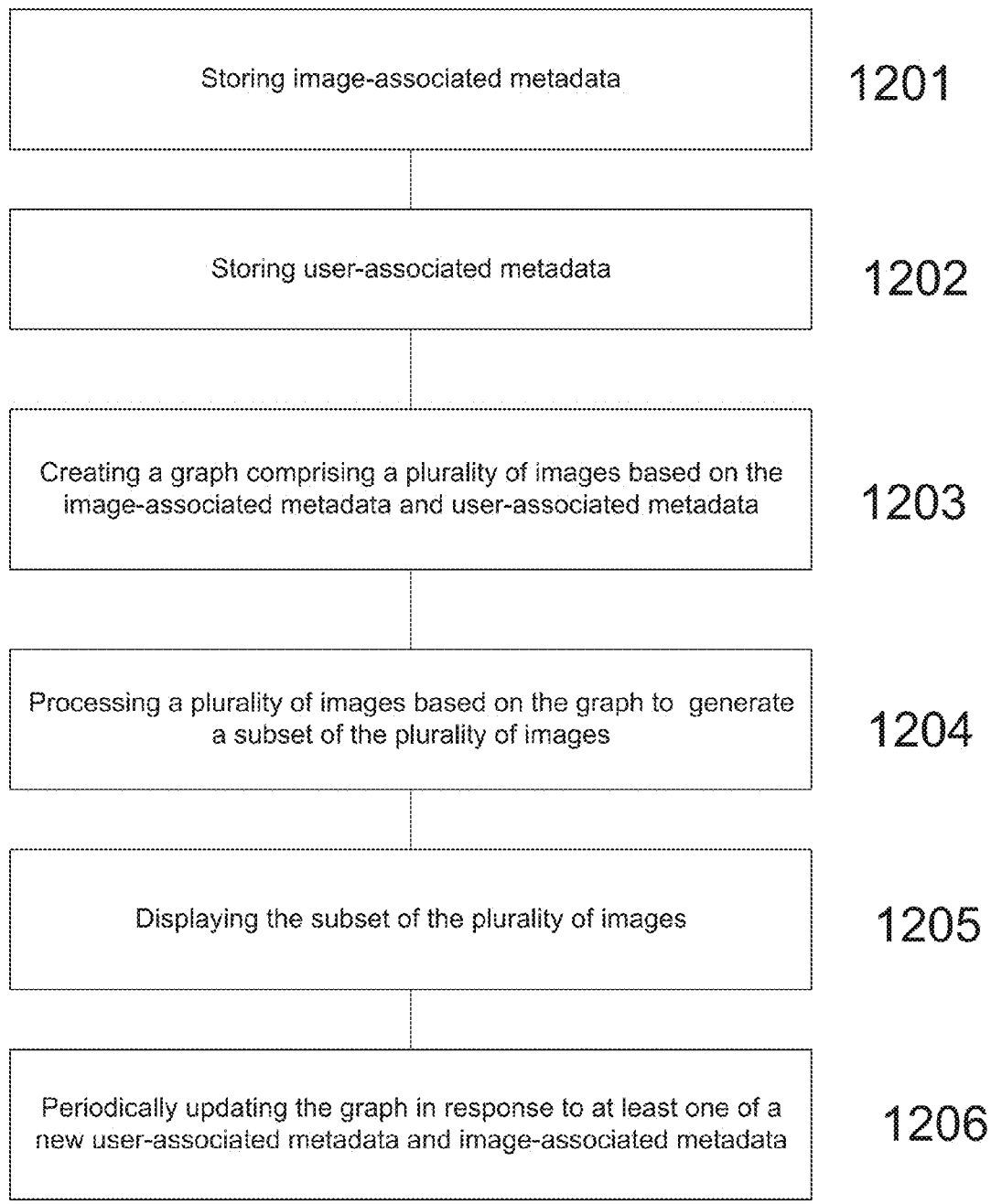
FIG. 12 is a flow diagram illustrating steps of a method for displaying a plurality of images.

FIG. 12 is a flow diagram illustrating steps of a method for displaying a set of images. In an embodiment of the present invention, method 1200 for displaying a set of images includes storing image-associated metadata (step 1201). In certain embodiments of the present invention, the image-associated metadata comprises a photographer identifier, an aesthetic score, and at least one of a plurality of tags, a plurality of albums, a location information, a time information, a weather information, a plurality of event information wherein the event information concerns events that occurred near at least one of the location information and the time information, a history of views, a history of likes, a history of purchases, and a plurality of computer-generated information. In certain embodiments, the metadata is generated automatically, for instance, by analyzing metadata in an image stored by a camera, using computer vision methods, analyzing semantic ontologies derived from existing user- and image-associated metadata, and analyzing the graph to determine co-occurrence or relevant tags Next, in method 1200, user-associated metadata is stored for each user (step 1202). In certain embodiments of the present invention, the user-associated metadata comprises a photographer score, an aggregate-image score, a plurality of impact scores, and at least one of a gender, an age, and an activity history.

Next, in method 1200, a graph comprising the set of images is created, wherein the graph is based on the image- and user-associated metadata (step 1203). In certain embodiments of the present invention, users and images comprise the nodes of the graph and the edges comprise relationships such as "likes" or "follows."

Next, in method 1200, the set of images is processed to generate a subset of images (step 1204). In certain embodiments of the present invention, the processing a set of images comprises receiving a search query from a user and generating a rank-sorted list of images based on the search query, where the order is based on the user- and image-associated metadata and the graph. In certain embodiments, the set or subset of images may be filtered, based on, for example, tags, locations, time, color space, etc. In certain embodiments, a recommendation is presented to the user, which might consist e.g. of a set of users who took similar images or a set of similar images. This recommendation, in certain embodiments, might be based on information known about the user (e.g. history of views, like, dislikes, location). In certain embodiments, the processing a set of images comprises sorting the images based on information known about the user or based on aesthetic scores of the images.

In some embodiments of the present invention, the processing of images may discard fringe cases like one-time wonder hits, where a limited amount of images get popular due to atypical reasons. By, for example, aggregating multiple scores and accounting for the size of the user's network and the image's reach, the image rating can be adjusted. Likewise, singularly good images can be identified despite the creator having previously contributed lesser quality images, or no images at all. This predictive rating is achieved by analyzing the graph for similar patterns to those of highly-rated users and by analyzing the image itself aesthetically.

In some embodiments of the present invention, the processing of images may be done within specific clusters, e.g. identifying the best photographers of a certain age or from a certain region, or the best images taken at a specific time or place, or are of a particular object or concept. The processing may also take into account the user's demographic information, previous searches, and the types of content the user previously created or interacted with. In some embodiments of the present invention, the processing is based on the user score 1002 (called user EyeRank). This permits sorting, filtering, searching, and displaying by user, e.g. by a user profile or portfolio.

Next, in method 1200, the subset of images is displayed to a user (step 1205).

In some embodiments, method 1200 includes periodically updating the graph in response to at least one of a new user-associated metadata and image-associated metadata (step 1206).

Figure 13:
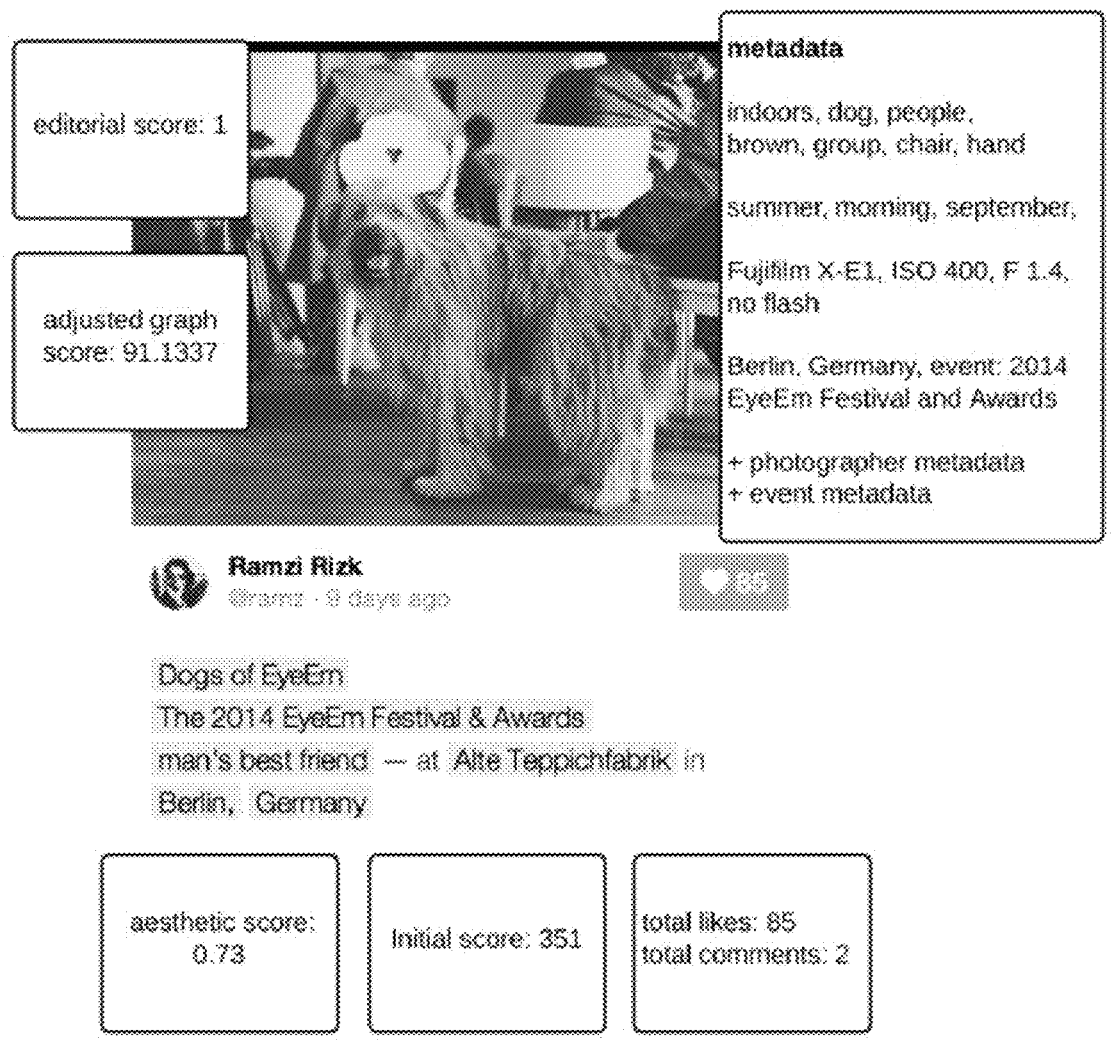
FIG. 13 is a graphical representation of image-associated metadata in accordance with exemplary embodiments of the present invention.

Referring now to FIG. 13, a graphical representation of image-associated metadata in accordance with exemplary embodiments of the present invention is provided. In an embodiment of the present invention, searching a set of images comprises searching metadata associated with a set of images. In an embodiment, an image may have metadata associated with it, including tags (e.g. "indoors," "dog," "people," etc.), event information (e.g. "EyeEm Festival and Awards at Berlin, Germany in 2014"), comments, albums, etc. This might include aggregated information, e.g. "total likes" or "total comments." It might also include scores associated with the image.

Figure 14:
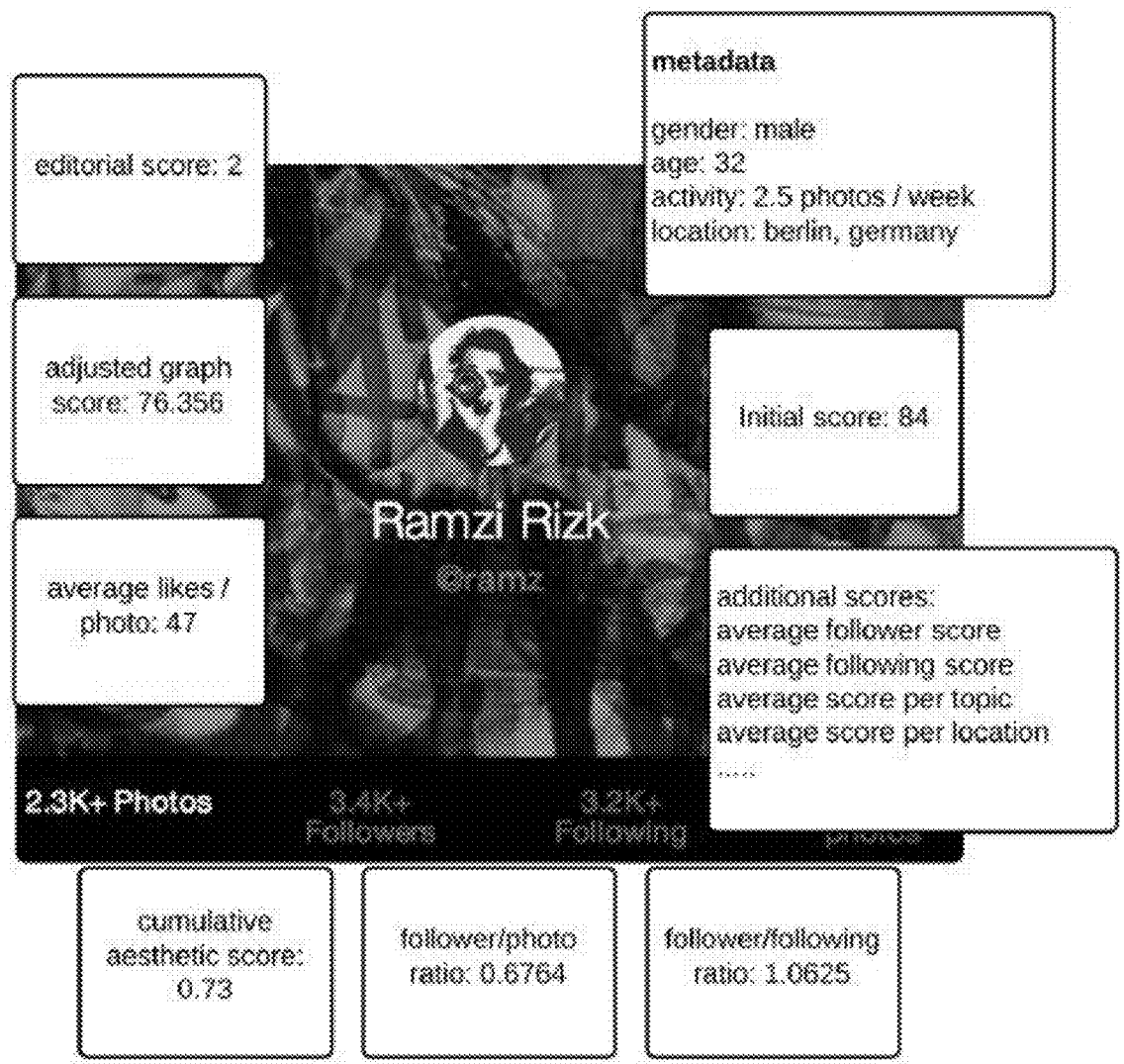
FIG. 14 is a graphical representation of user-associated metadata in accordance with exemplary embodiments of the present invention.

Referring now to FIG. 14, a graphical representation of user-associated metadata in accordance with exemplary embodiments of the present invention is provided. In an embodiment of the present invention, user-associated metadata may include gender (e.g. "male"), age (e.g. "32"), activity (e.g. "2.5 photos/week), and location (e.g. "berlin, germany"). User-associated metadata might also include an editorial score, an adjusted graph score, average likes per image, a cumulative aesthetic score over all images belonging to the user, a ratio of users following the user and images belonging to the user, and a ratio of users following the user and users being followed by the user.

Referring now to FIGS. 15a-c, a graphical representation of a graph in accordance with exemplary embodiments of the present invention is illustrated. In certain embodiments of the present invention, the nodes of the graph consist of users and images and the edges consist of relationships (e.g. likes, follows). This can include aggregate information, such as how many images of a given user another user has liked.

In some embodiments of the present invention, the graph is continually updated and scores are re-computed to account for the change. For instance, if there is a new user or a new image, a new node will be added; or, if a user or image is removed, the corresponding node will be removed (step 1501). An initial node score is then generated (step 1502). If there is a new relationship (e.g. likes, follows, other interactions), edges may be added, updated, or removed (step 1503). When the graph is changed, the user- and image-specific scores are recalculated (step 1504). This includes taking a snapshot of user and image scores (step 1505). This may also include storing the updated scores (step 1506). This may also involve making the scores available (step 1507).

Figure 16:
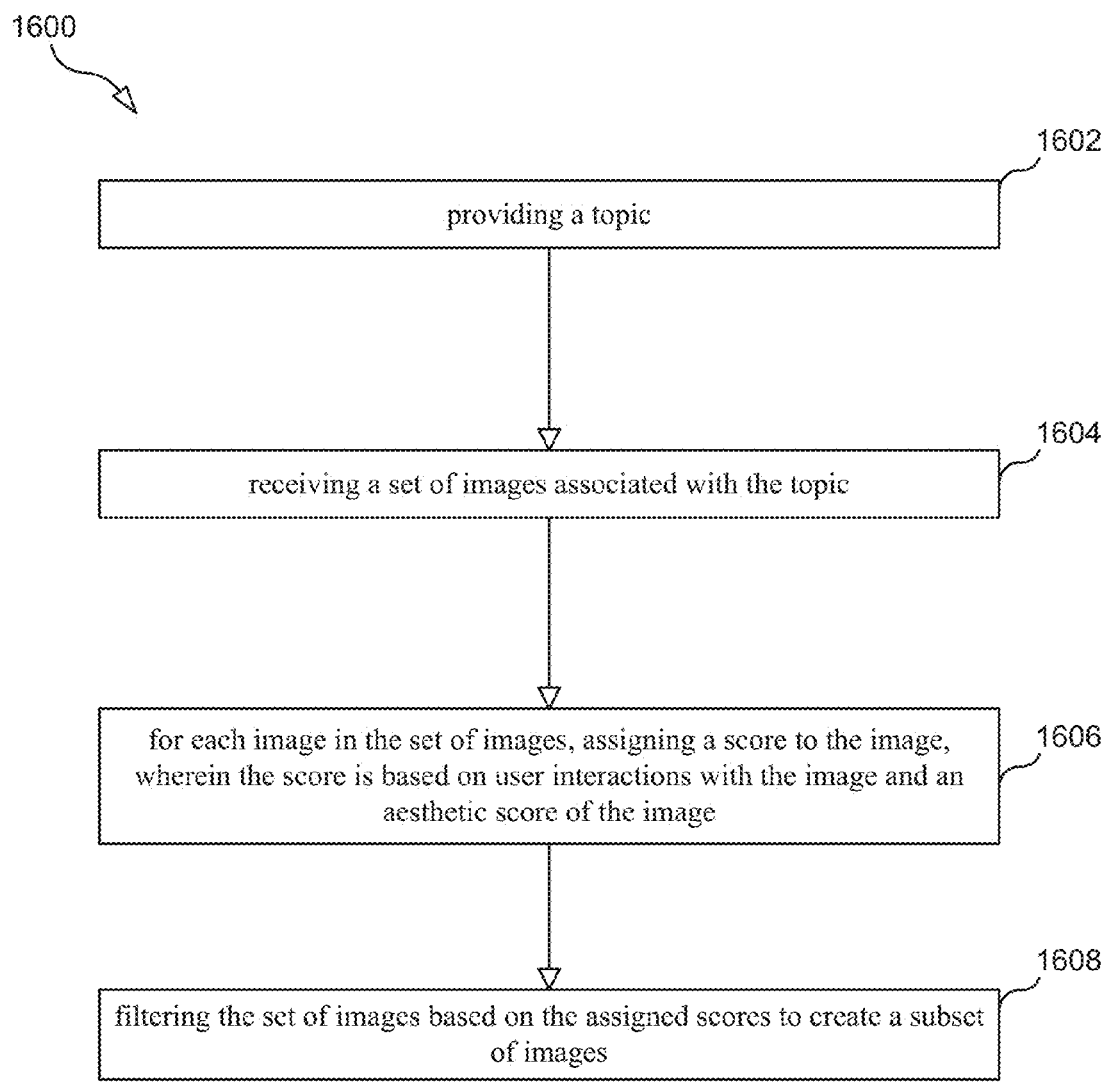
FIG. 16 is a flow diagram illustrating steps of a method for generating content associated with a topic

FIG. 16 is a flow diagram illustrating steps of a method 1600 for generating content associated with a topic. The method 1600 includes providing a topic (step 1602). In some embodiments, generating content associated with a topic can be used for curating content. For example, curated content can be used in web collections or print collections like magazines. In other embodiments, generating content associated with a topic can be used for generating a static webpage for search engine optimization. For example, search engines, crawlers, or spiders, have trouble indexing dynamic content. Being able to automatically generate static webpages comprising content associated with a topic allows search engines, crawlers, or spiders, to index relevant content and, for example, to improve a web page's ranking in the search engine. As a non-limiting example, a topic might include food, architecture, 16th century art, or anything else that a user might be interested in.

Next, in method 1600, a set of images associated with the topic is received (step 1602). In some embodiments, the received set of images includes search results for a pre-defined search parameter associated with the topic or images having metadata associated with the topic. In some embodiments, the relevant metadata or search parameters may be automatically generated or provided by a user. In some embodiments, the metadata may include tags associated with the topic. In some embodiments, a relevance score may be calculated, depending on how relevant the image is to the topic. This score may be based on the image or image metadata.

Next, in method 1600, for each image in the set of images, a score is assigned to the image, wherein the score is based on user interactions with the image and an aesthetic score of the image (step 1604). In some embodiments, this score is an image EyeRank score. In some embodiments, the aesthetic score is adapted to a user or a genre, for example a user or genre associated with the topic, or a user who is requesting the generated content.

Next, in method 1600, the set of images is filtered based on the assigned scores to create a subset of images (step 1606). In some embodiments, filtering the set of images based on the assigned scores to create a subset of images includes removing all but a top K number of the images, wherein K is a natural number. For example, the images having the K highest assigned scores will be kept, and the images having lower assigned scores will be removed. In some embodiments, filtering the set of images based on the assigned scores to create a subset of images includes removing all images where the assigned score less than a threshold value. In some embodiments, the threshold value is a pre-determine fixed value, while in other embodiments, the threshold value is adaptively determined based on the received images.

Next, in method 1600, an image is (in some embodiments) optionally removed from the subset of images based on input from a user and the image is replaced by an image with a next highest score from the set of images. For example, a user may not like an image in the subset of images, and indicate that it should be removed. That image will then be replaced by the image having the next highest assigned score.

Figure 17:
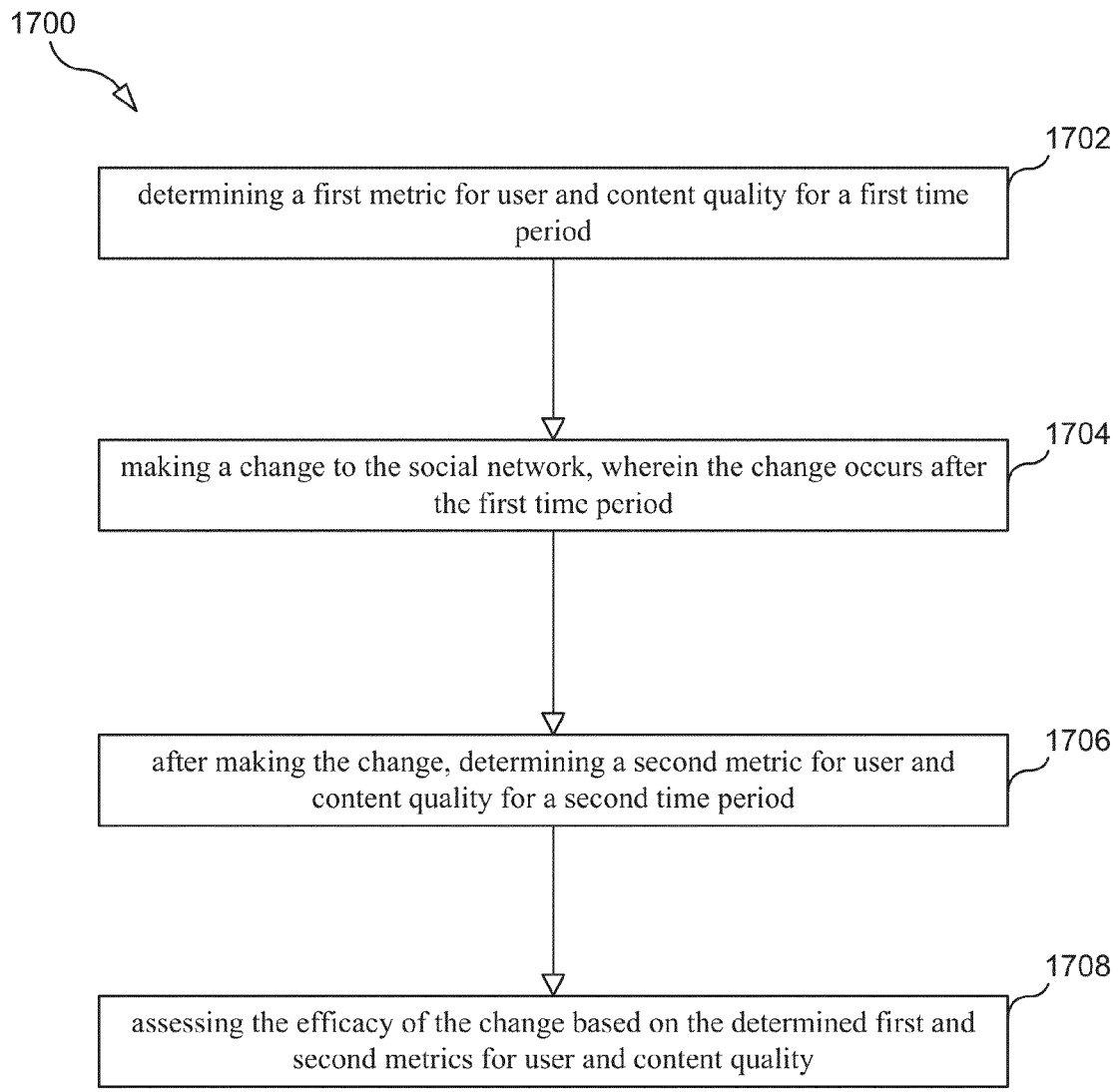
FIG. 17 is a flow diagram illustrating steps of a method for assessing the efficacy of changes to a social network including a plurality of users capable of uploading images to the social network.

FIG. 17 is a flow diagram illustrating steps of a method 1700 for assessing the efficacy of changes to a social network including a plurality of users capable of uploading images to the social network. The method 1700 includes determining a first metric for user and content quality for a first time period (step 1702).

Next, in method 1700, a change is made to the social network, wherein the change occurs after the first time period (step 1704).

Next, in method 1700, after making the change, a second metric is determined for user and content quality for a second time period (step 1706).

Next, in method 1700, the efficacy of the change is assessed based on the determined first and second metrics for user and content quality (step 1708).

In some embodiments, making a change that is positive will lead to higher quality users attracted to the social network and contributing higher quality images.

In some embodiments, a first set of images is received during the first time period and a second set of images is received during the second time period. In these embodiments, the first metric includes determining a number of good images in the first set, wherein an image is determined to be good based on an aesthetic score associated with the image. Likewise, in these embodiments, the second metric includes determining a number of good images in the second set, wherein an image is determined to be good based on an aesthetic score associated with the image. In some embodiments, determining an image to be good based on the aesthetic score includes using a pre-determined or adaptively determined threshold. For example, a threshold may be set by plotting all the aesthetic scores in a training set (which, for example, may contain examples of great, neutral, and bad images). The thresholds are chosen by finding the partition point in the graph where the ratio of good images (or great images) versus the remaining images is greater than a specified percentage (for example, 80%). In some embodiments, the first metric further includes determining a histogram of aesthetic scores associated with the first set of images and wherein the second metric further includes determining a histogram of aesthetic scores associated with the second set of images. In some embodiments, determining a photo to be good may be based on an image EyeRank score, or on both an image EyeRank score and an aesthetic score, and in some embodiments may also include a correlation between these scores. Some embodiments may use aesthetic score instead of an image EyeRank because, for example, aesthetic score is instantaneous in the sense that these scores may be calculated without the need for users to start following and liking other users' images, but is instead based on the uploaded image. In contrast, using an image EyeRank may require more time for user interactions and other factors to take place which influence the image EyeRank score. Thus, both scores together, or either individually, may be useful.

In some embodiments, a first set of users is received during the first time period and a second set of users is received during the second time period. In these embodiments, the first metric includes determining a number of good users in the first set, wherein a user is determined to be good based on a user score (for example, user EyeRank) associated with the user. Likewise, in these embodiments, the second metric includes determining a number of good users in the second set, wherein a user is determined to be good based on a user score (for example, user EyeRank) associated with the user. In some embodiments, determining a user to be good based on the user score includes using a pre-determined or adaptively determined threshold. For example, a threshold may be set by plotting all the user scores in a training set or based on an historical set of users (which, for example, may contain examples of great, neutral, and bad users). The thresholds are chosen by finding the partition point in the graph where the ratio of good users (or great users) versus the remaining users is greater than a specified percentage (for example, 80%). In some embodiments, the first metric further includes determining a distribution of good users in the first set and wherein the second metric further includes determining a distribution of good users in the second set.

In some embodiments, making a change to the social network includes changing a user signup process or changing how a user is exposed to content. In some embodiments, making a change to the social network includes changing a user experience design or user interface design. In some embodiments, assessing the efficacy of the change includes split AB testing.

In one particular embodiment of the present invention, a user may quickly, efficiently, and accurately zoom-in on a desired location of an image. A user is able to quickly zoom into an image displayed on a device using a single input action. The single input represents the desired zoom location, indicating where the user wants to center the enlarged image. In response to the user input, the user device requests a high resolution image from a remote device that stores the high resolution image. The user device receives the high resolution image and displays the received image to the user. The server the user is communicating with may aggregate the desired zoom location for images across multiple users and multiple user input actions. In one embodiment of the present invention, the feature extraction additionally comprises extracting a feature based on a desired zoom location. This desired zoom location may be based on aggregated data across multiple user input actions. The zoom-feature may be a location, e.g. a mean image pixel, a set of locations, or a distance at a given region to a nearest desired zoom location.

In one embodiment, the aggregated data consists of user input actions from users who have uploaded images with high aesthetic scores (e.g. having a high user EyeRank), or from users another subset of users related to the image. Additional aspects of systems, methods, and computer program products for enabling users to better display and view images and, more particularly, to zooming-in to high resolution images with a single user input, are set forth in U.S. application Ser. No. 14/453,185, filed Aug. 6, 2014, which is incorporated herein by reference.

In embodiments where a processor is included, computer readable program code (CRPC) may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the processor to perform steps described above (e.g., steps described above with reference to the flow charts shown in FIGS. 4, 7, and 8).

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

We claim:

1. A method for assigning an aesthetic score to an image, comprising:
   receiving an image;
   executing a neural network on the image to generate learned features; and
   applying a machine-learned model to assign an aesthetic score to the image, wherein a more aesthetically-pleasing image is given a higher aesthetic score and a less aesthetically-pleasing image is given a lower aesthetic score,
   wherein the learned features are inputs to the machine-learned model.

2. The method of claim 1, wherein the neural network is a deep neural network and the learned features are deep-learnt features.

3. The method of claim 2, wherein the neural network includes a stack of filters followed by one or more fully connected layers, wherein the filters include at least one of convolution filters, rectified-linear unit filters, and max-pooling filters.

4. The method of claim 3, wherein the learned features includes outputs of one or more layers of the neural network.

5. The method of claim 3, further comprising:
   extracting manually selected features from the image, wherein the manually selected features are indicative of aesthetic quality; and
   encoding the extracted manually selected features into a high-dimensional feature vector,
   wherein the neural network includes a fully connected layer which takes the encoded manually selected feature vector as an additional input.

6. The method of claim 5, wherein extracting the manually selected features comprises:
   determining a plurality of scales;
   for each of the plurality of scales, segmenting the image into a plurality of regions; and
   for each of the plurality of scales and the plurality of regions:
      computing a plurality of nearest and farthest regions according to a distance function;
      computing a local histogram of oriented gradients; and
      computing a color.

7. The method of claim 3, further comprising:
   extracting manually selected features from the image, wherein the manually selected features are indicative of aesthetic quality;
   encoding the extracted manually selected features into a high-dimensional feature vector;
   reducing the dimension of the high-dimensional feature vector; and
   concatenating the manually selected dimensionally-reduced feature vector and the learned features;
   wherein the concatenated features are inputs to the machine-learned model.

8. The method of claim 7, wherein extracting the manually selected features comprises:
   determining a plurality of scales;
   for each of the plurality of scales, segmenting the image into a plurality of regions; and
   for each of the plurality of scales and the plurality of regions:
      computing a plurality of nearest and farthest regions according to a distance function;
      computing a local histogram of oriented gradients; and
      computing a color.

9. The method of claim 2, wherein the neural network includes a recursive-neural-network structure.

10. The method of claim 1, further comprising:
    pre-processing the image for input into the neural network,
    wherein the executing the neural network on the image comprises executing the neural network on the pre-processed image.

11. The method of claim 1, wherein the neural network is trained by a process comprising:
    sampling a neural-net training set having a plurality of training images, wherein the sampling includes forming triplets $(Im_1^+, Im_2^+, Im_3^-)$ where $Im_1^+$ and $Im_2^+$ are members of the neural-net training set that are annotated as positive aesthetic images and $Im_3^-$ is a member of the neural-net training set that is annotated as a negative aesthetic image; and
    minimizing a loss function, whereby an embedding space is found where positive aesthetic images are close together and negative aesthetic images are spread apart.

12. The method of claim 11, wherein the loss function is a triple hinge loss function $\max(0, c - \delta(\phi(Im_1^+), \phi(Im_2^+)) + \delta(\phi(Im_1^+), \phi(Im_3^-)))$, where c is a constant, $\delta$ is a distance function in the embedding space, and $\phi$ represents the learned features.

13. The method of claim 11, wherein the loss function is a contrastive loss function.

14. The method of claim 1, wherein the neural network is adapted to a genre or a user from a base neural network by the training process comprising:
    providing an adapted training set, wherein the adapted training set includes images that the base neural network was not trained on; and
    initializing training parameters based on training parameters from the base neural network.

15. The method of claim 14, wherein the adapted training set includes images that are annotated based on a user.

16. The method of claim 15, wherein the annotation based on a user comprises annotating an image as aesthetically pleasing or not aesthetically pleasing based on whether the user has done at least one of: positively ranked or liked the image, viewed the image for an amount of time exceeding a predetermined threshold, visited the image for an amount of visits exceeding a predetermined threshold, purchased the image, positively ranked or liked a category associated with the image, positively ranked or liked a photographer associated with the image; and commented on the image.

17. The method of claim 16, wherein the annotation based on a user further comprises annotating an image based on a similarity of the image to a previously annotated image.

18. The method of claim 15, wherein the annotation based on a user comprises annotating an image as aesthetically pleasing or not aesthetically pleasing based on an analysis of a social network of the user.

19. The method of claim 15, wherein the annotation based on a user comprises annotating an image as aesthetically pleasing or not aesthetically pleasing based on results from a recommendation engine, wherein the recommendation engine is based on user-metadata, image-metadata, and a social network of the user.

20. A method for ranking images by aesthetic quality for display, comprising:
    receiving a plurality of images;
    assigning an aesthetic score to each of the plurality of images, wherein the aesthetic score is generated by the method of claim 1; and
    displaying the plurality of images in an order based on the aesthetic score.

21. The method of claim 20, wherein the displaying the plurality of images comprises displaying a subset of the plurality of images.

22. The method of claim 21, wherein the subset of the plurality of images is limited to a fixed number of images.

23. The method of claim 21, wherein the subset of the plurality of images is based on a minimum aesthetic score.

24. A method for searching images by aesthetic quality, comprising:
    receiving a search query;
    searching a plurality of images based on the search query, whereby a list of search results is generated; and
    displaying the list of search results by the method of claim 20.

25. The method of claim 24, wherein the searching a plurality of images comprises searching a plurality of metadata associated with the plurality of images.

26. A device for assigning an aesthetic score to an image, comprising:
    a processor;
    a memory coupled to the processor; and
    a network interface coupled to the processor,
    wherein the processor is configured to:
       receive an image;
       execute a neural network on the image to generate learned features; and
       apply a machine-learned model to assign an aesthetic score to the image, wherein a more aesthetically-pleasing image is given a higher aesthetic score and a less aesthetically-pleasing image is given a lower aesthetic score, wherein the learned features are inputs to the machine-learned model.

27. A computer program product for assigning an aesthetic score to an image, said computer program product comprising a non-transitory computer readable medium storing computer readable program code embodied in the medium, said computer program product comprising:
program code for receiving an image;
program code for executing a neural network on the image to generate learned features; and
program code for applying a machine-learned model to assign an aesthetic score to the image, wherein a more aesthetically-pleasing image is given a higher aesthetic score and a less aesthetically-pleasing image is given a lower aesthetic score,
wherein the learned features are inputs to the machine-learned model.

* * * * *